(12) United States Patent
Kuno et al.

(10) Patent No.: US 6,676,230 B2
(45) Date of Patent: Jan. 13, 2004

(54) VEHICLE MOTION CONTROL DEVICE

(75) Inventors: Tetsuya Kuno, Toyota (JP); Tetsuaki Tsuzuki, Gamagori (JP); Akitaka Nishio, Anjo (JP); Masanobu Fukami, Aichi (JP); Shiro Monzaki, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 55 days.

(21) Appl. No.: 09/981,923

(22) Filed: Oct. 19, 2001

(65) Prior Publication Data

US 2002/0057013 A1 May 16, 2002

(30) Foreign Application Priority Data

Oct. 19, 2000 (JP) .................................. 2000-320024
Feb. 14, 2001 (JP) .................................. 2001-037073

(51) Int. Cl.$^7$ ................................................. B60T 8/44
(52) U.S. Cl. ............................... 303/114.3; 303/115.3
(58) Field of Search ..................... 303/114.3, 115.3, 303/156, 140, 146, DIG. 8

(56) References Cited

U.S. PATENT DOCUMENTS

| | | | | |
|---|---|---|---|---|
| 4,361,164 A | * | 11/1982 | Sakakibara et al. | ........... 137/14 |
| 5,051,907 A | * | 9/1991 | Kuwana et al. | ................ 701/79 |
| 6,006,648 A | * | 12/1999 | Eckert | ...................... 303/114.3 |
| 6,203,118 B1 | * | 3/2001 | Takayama et al. | ....... 303/113.4 |
| 6,345,565 B1 | * | 2/2002 | Tsubouchi et al. | ............ 91/367 |
| 6,357,837 B1 | * | 3/2002 | Linden et al. | ............ 303/114.3 |

FOREIGN PATENT DOCUMENTS

| EP | 0627 350 | * | 6/1994 |
|---|---|---|---|
| JP | 2000-103330 | * | 11/2000 |

* cited by examiner

Primary Examiner—Jack Lavinder
Assistant Examiner—Bradley King
(74) Attorney, Agent, or Firm—Burns, Doane, Swecker & Mathis, LLP

(57) ABSTRACT

A vehicle motion control device reduces noise resulting from operation of a vacuum booster when an automatic pressure control is performed by properly controlling the energization of a linear solenoid of a booster actuator. An automatic hydraulic pressure generator is controlled in accordance with the vehicle motion condition and a hydraulic pressure control valve device is controlled to perform the automatic pressure control. A target electric current of the linear solenoid for actuating the vacuum booster is instantaneously increased to a starting target value which corresponds to an electric current value immediately before starting the operation of the vacuum booster and which is less than a maximum value of the target electric current, and then is gradually increased approximately to the maximum value of the target electric current.

11 Claims, 17 Drawing Sheets

VEHICLE MOTION CONTROL DEVICE

This application is based on and claims priority under 35 U.S.C. §119 with respect to Japanese Application No. 2000-320024 filed on Oct. 19, 2000 and Japanese Application No. 2001-037073 filed on Feb. 14, 2001, the entire contents of both of which is incorporated herein by reference.

FIELD OF THE INVENTION

This invention generally relates to a vehicle motion control device for controls such as traction control and brake steering control. More particularly, the present invention pertains to a vehicle motion control device which includes a hydraulic pressure control valve device between an automatic hydraulic pressure generator for generating brake hydraulic pressure by actuating a vacuum booster irrespective of operation of a brake pedal and respective wheel cylinders for controlling the automatic hydraulic pressure generator and the hydraulic pressure control valve in accordance with the motion condition of the vehicle for performing automatic pressure control relative to the wheel cylinders.

BACKGROUND OF THE INVENTION

A vehicle motion control device in which the vacuum booster is applied to the automatic pressure control for traction control includes a booster actuator for actuating the vacuum booster irrespective of brake pedal operation. The traction control is performed by controlling the booster actuator irrespective of the brake pedal operation. To actuate the booster actuator, it is known to use a device provided with a linear solenoid for providing an appropriate control in accordance with the vehicle motion condition.

Various types of vacuum boosters are known. Generally speaking, vacuum boosters include a housing having an interior divided into a constant pressure chamber and a variable pressure chamber by a movable wall. The movable wall is connected in a unitary manner to a power piston, and the constant pressure chamber is always in communication with an intake manifold of the engine so that negative pressure is introduced into the constant pressure chamber. The power piston includes a vacuum valve for establishing or interrupting communication between the constant pressure chamber and the variable pressure chamber, and an air valve for establishing or interrupting communication between the variable pressure chamber and the atmosphere. The power piston is connected to a master cylinder via a reaction disc and an output rod. In the vacuum booster constructed in the foregoing manner, a booster actuator for automatically actuating the vacuum booster is provided to perform the automatic pressure control.

Japanese Patent Laid-Open Publication No. H10-258716 discloses a brake hydraulic pressure control device for improving the response at starting of a spool type hydraulic pressure control valve which is provide with a linear solenoid that functions as a hydraulic pressure control valve. According to this published application, when a target hydraulic pressure becomes greater than a predetermined value, a maximum actuating electric current is provided to the linear solenoid for a predetermined time. It is also proposed to vary the time period to provide the maximum actuating electric current in accordance with the target hydraulic pressure.

As disclosed in the Japanese Patent Laid-Open Publication No. H10-258716, when the brake hydraulic pressure control is performed by the electric current control of the linear solenoid, the electric current is instantaneously increased immediately after energization to start the brake control at a stretch. Then, the electric current is dropped or reduced to the target current level. This is intended to avoid the delay of starting the control and to reduce the dispersion of the output. However, in the case of a linear solenoid of the booster actuator provided in the automatic hydraulic pressure generator for generating the brake hydraulic pressure by actuating the vacuum booster irrespective of the operation of the brake pedal, various problems occur at automatic hydraulic pressure control when the brake pedal is not operated.

When the vacuum booster is actuated by energizing the linear solenoid of the booster actuator when the brake pedal is not operated, the air valve in the vacuum booster is suddenly opened to introduce atmospheric air into the variable pressure chamber. This generates a loud operation noise. Simultaneously, the valve operation is transmitted to the vehicle body via the reaction disc, thus generating vibration noise. These noises cannot be ignored from the standpoint of desirable NV performance (i.e., noise and vibration performance), particularly when the brake pedal is not operated, it is necessary to reduce the noise as mich as possible. Likewise, the tapping noise generated when the actuation of the vacuum booster is released by the booster actuator also needs to be reduced.

To address the aforementioned problems, it is necessary to gradually energize the linear solenoid. However, the foregoing known vehicle motion control device is designed to control the energization of the linear solenoid by increasing the electric current at one stretch and then dropping to the target electric current, to thus reduce the time delay of the energization of the linear solenoid for starting the operation which derives from the characteristics of the linear solenoid. Thus, gradual energization of the linear solenoid is not taken into consideration in the known vehicle motion control device. In the known vehicle motion control device, in the meantime, the energization of the linear solenoid of the booster actuator is instantaneously cut off when the actuation of the vacuum booster by the booster actuator is released upon ending the control.

A need thus exists for a vehicle motion control device for actuating the vacuum booster by the booster actuator which reduces the noise derived or resulting from the operation of the vacuum booster when the brake pedal is not operated.

SUMMARY OF THE INVENTION

The present invention provides a vehicle motion control device which includes a variable pressure chamber, a constant pressure chamber, a plurality of wheel cylinders provided on respective wheels of a vehicle, an automatic hydraulic pressure generator for generating a brake hydraulic pressure irrespective of operation of a brake pedal, a hydraulic pressure control valve device provided between the automatic hydraulic pressure generator and the respective wheel cylinders for controlling a brake hydraulic pressure of respective wheel cylinders, and a controller for performing a vehicle motion control by controlling the automatic hydraulic pressure generator in accordance with the vehicle motion condition of the vehicle, by controlling the hydraulic pressure control valve device, and by performing the automatic pressure control at the wheel cylinders irrespective of the operation of the brake pedal. The automatic hydraulic pressure generator includes a linear solenoid, a vacuum booster operating at least in accordance with the operation of the brake pedal, and a booster actuator for actuating the vacuum booster by controlling the linear solenoid based on a predetermined target electric current irrespective of the operation of the brake pedal. The controller makes a determination to instantaneously increase the target electric current of the linear solenoid to an electric current value which corresponds to an electric value immediately before the vacuum booster starts the operation and which is lower than a maximum value of the target electric current of the linear solenoid, and to gradually increase the target electric current of the linear solenoid close to the maximum value of the target electric current when the brake pedal is not operated.

According to another aspect of the invention, the vehicle motion control device includes a variable pressure chamber, a constant pressure chamber, a plurality of wheel cylinders provided on respective wheels of a vehicle, an automatic hydraulic pressure generator for generating a brake hydraulic pressure irrespective of operation of a brake pedal, a hydraulic pressure control valve device provided between the automatic hydraulic pressure generator and the respective wheel cylinders for controlling a brake hydraulic pressure of respective wheel cylinders, and a controller for performing a vehicle motion control by controlling the automatic hydraulic pressure generator in accordance with the vehicle motion condition of the vehicle, by controlling the hydraulic pressure control valve device, and by performing the automatic pressure control at the wheel cylinders irrespective of the operation of the brake pedal. The automatic hydraulic pressure generator includes a linear solenoid, a vacuum booster operating at least in accordance with the operation of the brake pedal, and a booster actuator for actuating the vacuum booster by controlling the linear solenoid based on a predetermined target electric current irrespective of the operation of the brake pedal. The controller makes a determination to instantaneously decrease the target electric current of the linear solenoid from the actuated condition by the booster actuator to a termination target value which corresponds to an electric value immediately before stopping the actuation of the vacuum booster, and then to gradually decreases the target electric current of the linear solenoid until decreasing to approximately zero when the brake pedal is not operated.

According to a further aspect of the invention, the vehicle motion control device includes a variable pressure chamber, a constant pressure chamber, a plurality of wheel cylinders provided on respective wheels of a vehicle, an automatic hydraulic pressure generator for generating a brake hydraulic pressure irrespective of operation of a brake pedal, a hydraulic pressure control valve device provided between the automatic hydraulic pressure generator and the respective wheel cylinders for controlling a brake hydraulic pressure of respective wheel cylinders, and a controller for performing a vehicle motion control by controlling the automatic hydraulic pressure generator in accordance with the vehicle motion condition of the vehicle, by controlling the hydraulic pressure control valve device, and by performing the automatic pressure control at the wheel cylinders irrespective of the operation of the brake pedal. The automatic hydraulic pressure generator includes a linear solenoid, a vacuum booster operating at least in accordance with the operation of the brake pedal, and a booster actuator for actuating the vacuum booster by controlling the linear solenoid based on a predetermined target electric current irrespective of the operation of the brake pedal. The controller makes a determination to gradually decrease the target electric current of the linear solenoid from the actuated condition by the booster actuator until decreasing to approximately zero when the brake pedal is not operated.

According to still further aspect of the present invention, a vehicle motion control device includes a plurality of wheel cylinders provided on respective wheels of a vehicle, an automatic hydraulic pressure generator for generating a brake hydraulic pressure irrespective of operation of a brake pedal, a hydraulic pressure control valve device provided between the automatic hydraulic pressure generator and the respective wheel cylinders for controlling a brake hydraulic pressure of respective wheel cylinders, and a controller for performing a vehicle motion control by controlling the automatic hydraulic pressure generator in accordance with the vehicle motion condition of the vehicle, by controlling the hydraulic pressure control valve device, and by performing the automatic pressure control at the wheel cylinders irrespective of the operation of the brake pedal. The automatic hydraulic pressure generator includes a linear solenoid, a vacuum booster operating at least in accordance with the operation of the brake pedal, and a booster actuator for actuating the vacuum booster by controlling the linear solenoid based on a predetermined target electric current irrespective of the operation of the brake pedal. The controller makes a determination to instantaneously increase the target electric current of the linear solenoid to a starting target value which corresponds to an electric current value immediately before the vacuum booster starts the operation by the actuation of the booster actuator and which is less than the maximum value of the target electric current of the linear solenoid, and to gradually increase the target electric current approximately to the maximum value of the target electric current when the brake pedal is not operated and before the vehicle motion control starts.

The automatic pressure control when the brake pedal is not operated before the start of the vehicle motion control is referred to here as a pre-control.

BRIEF DESCRIPTION OF THE DRAWING FIGURES

The foregoing and additional features and characteristics of the present invention will become more apparent from the following detailed description considered wit reference to the accompanying drawing figures in which like reference numerals designate like elements.

DETAILED DESCRIPTION OF THE INVENTION

Figure 1:
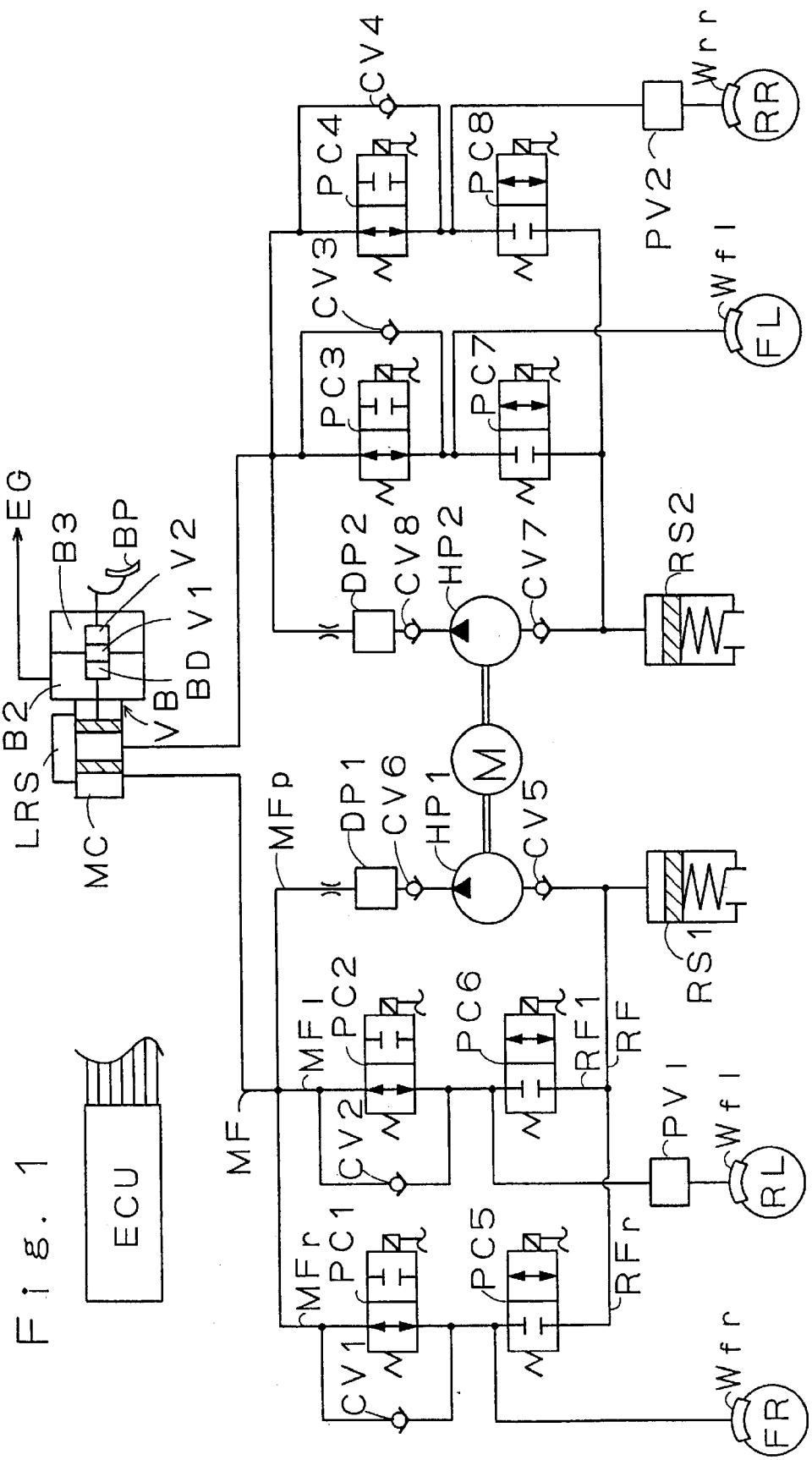
FIG. 1 is a schematic illustration of the vehicle motion control device according the present invention.

Referring initially to FIG. 1, the vehicle motion control device according to a first embodiment of the present invention involves the use of a master cylinder MC actuated via a vacuum booster VB in accordance with the operation of a brake pedal BP. The brake fluid in a master reservoir LRS is pressurized to output the master cylinder hydraulic pressure to two brake hydraulic pressure systems, one for the FR, RL wheel side and the other for the FL, RR wheel side. A so-called X type dual circuit is thus employed. The master cylinder MC is a tandem type master cylinder having two pressure chambers. A first pressure chamber is in communication with the brake hydraulic pressure system on the FR, RL wheel side. A second pressure chamber is in communication with the brake hydraulic pressure system of the FL, RR wheel side.

In the brake hydraulic pressure system for the FR, RL wheel side of the first embodiment, the first pressure chamber is connected to wheel cylinders Wfr, Wrl via a main hydraulic pressure conduit MF and branch hydraulic pressure conduits MFr, MFl respectively. The branch hydraulic pressure conduits MFr, MFl are provided with normally open type two-port two-position solenoid valves PC1, PC2 (hereinafter referred to as solenoid valves PC1, PC2) respectively. The outlet side branch hydraulic pressure conduits RFr, RFl which are in communication with the wheel cylinders Wfr, Wrl are provided with normally open type two-port two-position solenoid valves PC5, PC6 (hereinafter referred as solenoid valves PC5, PC6) respectively. An output hydraulic pressure conduit RF merged with or connected to the branch hydraulic pressure conduits RFr, RFl is connected to an auxiliary reservoir RS1.

Further, two check valves CV1, CV2 are provided in parallel with the solenoid valves PC1, PC2 respectively. The check valves CV1, CV2 allow the flow of brake fluid to the master cylinder MC and restrict the flow of the brake fluid to the wheel cylinders Wfr, Wrl. The brake fluid in the wheel cylinders Wfr, Wrl is returned to the master cylinder MC and to the master reservoir LRS via the check valves CV1, CV2. Thus, the hydraulic pressure in the wheel cylinders Wfr, Wrl can promptly follow the decrease of the hydraulic pressure of the master cylinder MC side when the brake pedal BP is released.

With respect to the brake hydraulic pressure system on the FR, RL wheel side, a hydraulic pressure pump HP1 is provided on a hydraulic pressure conduit MFp which is in communication with the branch hydraulic pressure conduits MFr, MFl on the upstream side of the solenoid valves PC1, PC2. The suction side of the hydraulic pressure pump HP1 is connected to an auxiliary reservoir RS1 via a check valve CV5. The hydraulic pressure pump HP1 is actuated by an electric motor, which also actuates another hydraulic pressure pump HP2, to introduce the brake fluid from the suction side, to increase the pressure of the brake fluid to a predetermined pressure, and to output the pressurized brake fluid from the output side. The auxiliary reservoir RS1 is provided independently from the master reservoir LRS of the master cylinder MC. The auxiliary reservoir RS1 is also called an accumulator which is provided with a piston and a spring to reserve the brake fluid in an amount necessary for the various controls.

The outlet side of the hydraulic pressure pump HP1 is connected to the solenoid valves PC1, PC2 via a check valve CV6 and a damper DP1. The check valve CV5 stops the flow of the brake fluid to the auxiliary reservoir RS1 and allows the flow of the brake fluid in the reverse direction. The check valve CV6 which is usually unitarily provided in the hydraulic pressure pump HP1 restricts the flow of the brake fluid outputted via the hydraulic pressure pump HP1 in a constant direction. The damper DP1 is provided on the outlet side of the hydraulic pressure pump HP1. A proportioning valve PV1 is provided on the hydraulic pressure conduit which is in communication with the wheel cylinder Wrl on the rear wheel side.

The brake fluid pressure system on the FL, RR wheel side also includes normally open type two-port two-position solenoid valves PC3, PC4, normally closed type two-port two-position solenoid valves PC7, PC8, check valves CV3, CV4, CV7, CV8, an auxiliary reservoir RS2, a damper DP2, and a proportioning valve PV2. The hydraulic pressure pump HP2 is actuated along with the hydraulic pressure pump HP1 by the electric motor M.

A hydraulic pressure control valve device of the present invention includes the solenoid valves PC1–PC8. The solenoid valves PC1–PC8 are actuated and controlled by an electric controller ECU to perform various controls such as traction control and brake steering control. For instance, regarding the hydraulic pressure control of the wheel cylinder Wfr of the wheel FR, the solenoid valve PC1 is opened and the solenoid valve PC5 is closed during the pressure increase mode or during the normal brake operation. The solenoid valve PC1 is closed and the solenoid valve PC5 is opened during the pressure decrease mode. The solenoid valve PC1 and the solenoid valve PC5 are closed during the pressure maintaining mode.

The electric controller ECU includes a microcomputer having a processing unit, a memory ROM, a RAM, an input port, and an output port which are connected one another via a bus. Output signals from a wheel speed sensor, a brake switch, a front wheel steering angle sensor, a yaw rate sensor, a lateral acceleration sensor, and a throttle sensor are to be inputted from respective input ports to the processing unit via an amplifying circuit. The output port outputs the control signal via the actuating circuit.

In the electric controller ECU, programs for various transactions or operations are memorized in the memory ROM, the processing unit carries out the program while the ignition switch (not shown) is closed, and the variable data necessary for carrying out the program is tentatively memorized in the memory RAM. A plurality of microcomputers which are electrically connected to one another can be structured by combining related controls and for electrically connecting computers.

Figure 2:
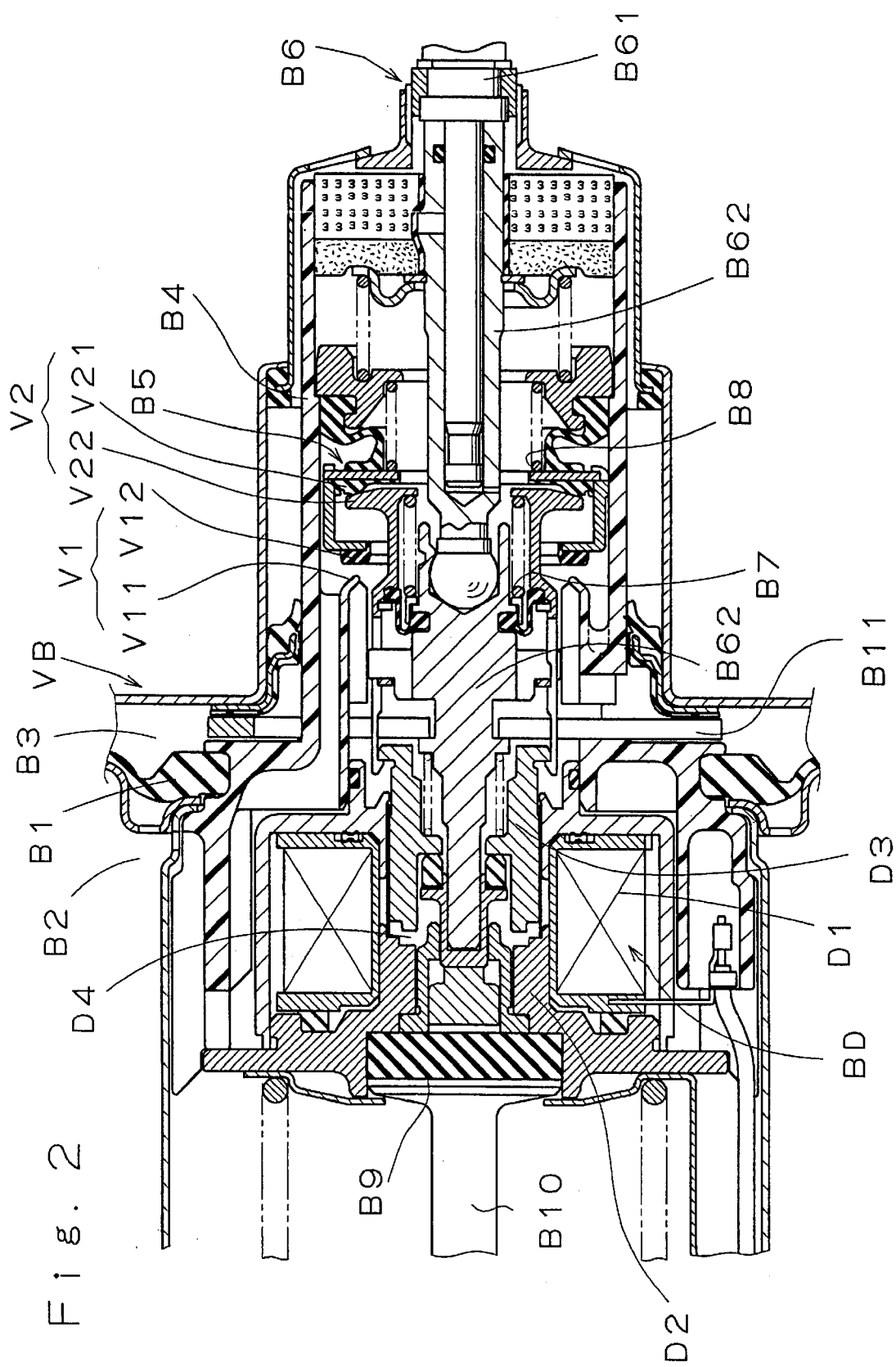
FIG. 2 is a cross-sectional view of a vacuum booster according to the present invention.

As shown in FIG. 2, the vacuum booster VB includes a booster actuator BD for automatically actuating the vacuum booster VB at least when the brake pedal is not operated. The vacuum booster VB includes a constant pressure chamber B2 and a variable pressure chamber B3 which form a movable wall (i.e., diaphragm) B1. The movable wall B1 is unitarily connected with a power piston B4. The constant pressure chamber B2 is always in communication with an intake manifold of the engine (shown as EG in FIG. 1) so that negative pressure (i.e., a vacuum) is introduced into the constant pressure chamber B2. The power piston B4 is connected with an output rod B10 via a fixed core D2 and a reaction disc B9 for transmitting the force. The output rod B10 is connected with the master cylinder MC.

The power piston B4 includes a valve mechanism B5 having a vacuum valve V1 for establishing or interrupting the communication between the constant pressure chamber B2 and the variable pressure chamber B3 and an air valve V2 for establishing or interrupting the communication between the variable pressure chamber B3 and the atmosphere. The vacuum valve V1 includes an annular valve seat V11 formed on the power piston B4 and an elastic valve body V12 which is detachable or disengageable from the annular valve seat V11. The air valve V2 includes an elastic valve seat V21 equipped on the elastic valve body V12 and a valve body V22 detachable or disengageable from the elastic valve seat V21. The valve body V22 is connected with an input rod B6 which is operatively connected with the brake pedal BP and is biased in the direction to seat to the elastic valve seat V21 by a biasing force of a first spring B7. A second spring B8 biases the elastic valve body V12 of the vacuum valve V1 in the direction to be seated to the annular valve seat V11. The elastic valve seat V21 of the air valve V2 is biased in the direction to be seated to the valve body 22 by the biasing force of the second spring B8.

Accordingly, in accordance with the operation of the brake pedal BP, the vacuum valve V1 and the air valve V2 of the valve mechanism B5 are opened and closed to generate the differential pressure between the constant pressure chamber B2 and the variable pressure chamber B3 in accordance with the stepping force of the brake pedal. As a result, the output boosted in accordance with the operation of the brake pedal BP is transmitted to the master cylinder MC.

The booster actuator BD includes a linear solenoid D1, a fixed core D2, and a movable core D3. Upon energization, the linear solenoid D1 attract the movable core D3 towards the fixed core D2. The linear solenoid D1 is electrically connected to the electric controller ECU shown in FIG. 1. The fixed core D2 provided between the power piston B4 and the reaction disc B9 transmits the force from the power piston B4 to the reaction disc B9. The movable core D3 is engaged with the valve body V22 of the air valve V2. A clearance D4 is formed between the movable core D3 and the fixed core D2. When the movable core D3 moves relative to the fixed core D2 in the direction to reduce the clearance D4, the valve body V22 of the air valve V2 is unitarily moved with the movable core D3. The booster actuator BD switches an actuating position for establishing communication between the variable pressure chamber B3 and the atmosphere and a released position for releasing the actuating position irrespective of the operation of the brake pedal BP. The vacuum booster VB is actuated by the valve mechanism B5 in accordance with the brake pedal operation at the released position.

The input rod B6 includes a first input rod S61 and a second input rod B62. The first input rod B61 is unitarily connected to the brake pedal BP. The second input rod B62 is movable relative to the first input rod B6 and transmits the force to the output rod B10 side via a key member B11 by the power piston B4. Accordingly, when only the second input rod B62 is actuated in the forward direction, the first input rod B61 is left behind. The first and the second input rods B61, B62 form a mechanism for leaving a pedal behind.

An automatic hydraulic pressure generator includes the vacuum booster VB, the booster actuator BD, and the master cylinder MC. The operation of the vacuum booster VB when performing the automatic pressure control such as traction control and brake steering control to the wheels to be braked by the automatic hydraulic pressure generator at least when the brake pedal is not operated is as follows.

When the automatic pressure control is started by the electric controller ECU, the linear solenoid D1 is energized, the movable core D3 is moved towards the clearance D4, and the valve body V22 of the air valve V2 unitarily moves with the movable core D3 by overcoming the biasing force of the first spring B7. As a result, the elastic valve body V12 of the vacuum valve V1 is seated to the annular valve seat V11 by the spring B8 to interrupt the communication between the variable pressure chamber B3 and the constant pressure chamber B2. Then, because the valve body V22 of the air valve V2 further moves, the valve body V22 is separated from the elastic valve seat V21 to introduce atmospheric air into the variable pressure chamber B3. Accordingly, the differential pressure is generated between the variable pressure chamber B3 and the constant pressure chamber B2 to move the power piston B4, the fixed core D2, the reaction disc B9, and the output rod B10 towards the master cylinder MC side shown in FIG. 1. The brake hydraulic pressure is thus automatically outputted from the master cylinder MC.

After the power piston B4 is engaged with the key member B11, the second input rod B62 engaged with the key member B11 moves forwards unitarily with the power piston B4. In this case, the forwarding force of the power piston B4 is not transmitted to the first input rod B61 so that the first input rod B61 is maintained at the initial position. While the vacuum booster VB is automatically actuated by the booster actuator BD, the brake pedal BP is maintained at the initial position.

For instance, upon the traction control, in accordance with the acceleration slip condition of the wheel FR, one of the hydraulic pressure control modes (i.e., one of the instantaneous pressure increase, the pulse pressure increase, the pulse pressure decrease, and the maintaining pressure) is set for the wheel cylinder Wfr by the control of the solenoid valves PC1, PC5. Thus, the braking torque is applied to the wheel FR to restrict the rotational driving force, the acceleration slip is prevented, and the traction control can be performed properly. Likewise, the acceleration slip prevention control can be performed at the wheel FL.

Figure 3:
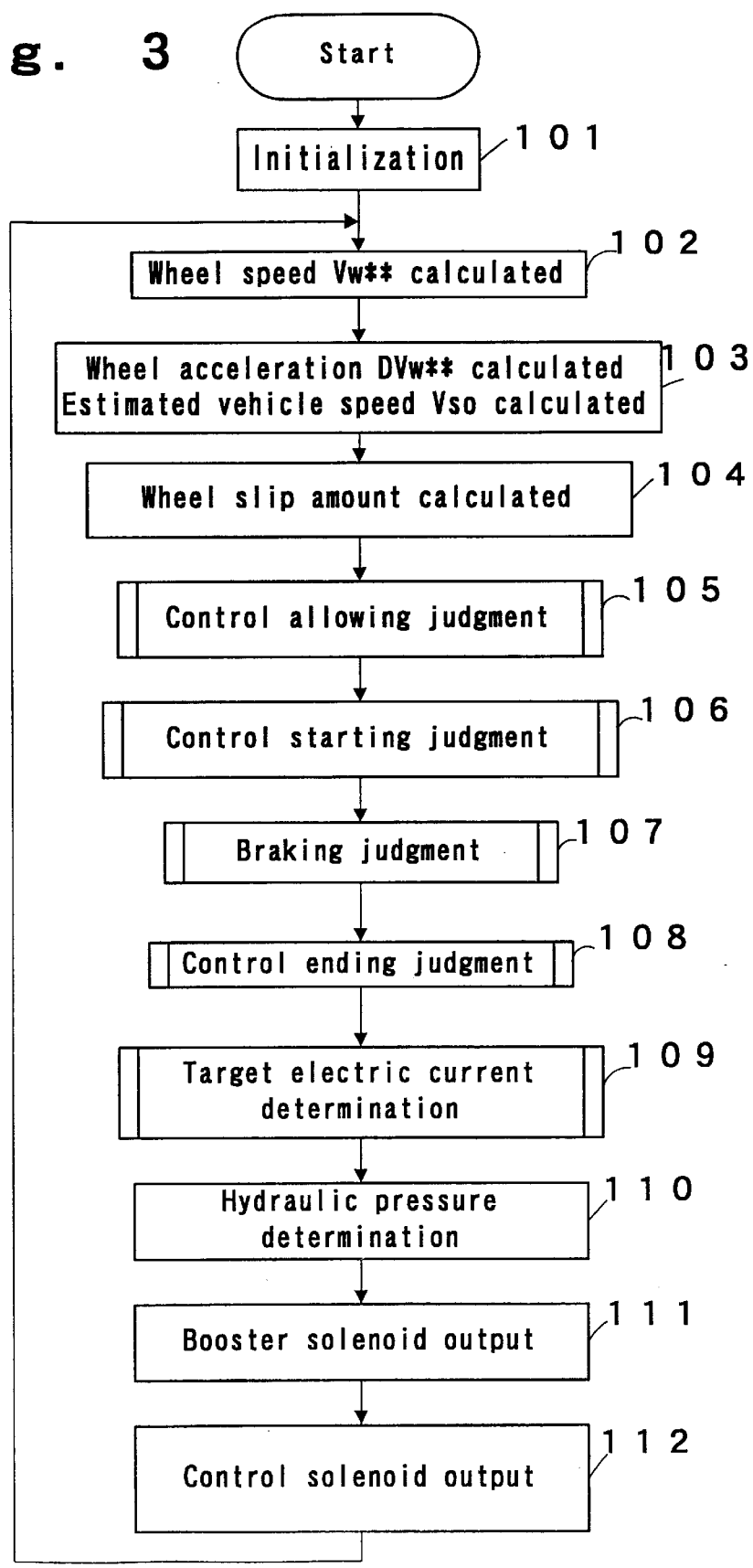
FIG. 3 is a flowchart showing an overview of the traction control of the vehicle according to a first embodiment of the present invention.

When an ignition switch is opened, for instance, a program of the traction control shown in FIG. 3 is carried out with a predetermined calculation cycle (e.g., 6 ms). Referring to FIG. 3 a microcomputer CMP is initialized in Step 101 to clear various calculated values. In Step 102, a wheel speed Vw ( corresponds to or designates the wheels FL, FR, RL, RR) is calculated based on a detection signal of a wheel speed sensor. In Step 103, the wheel speed Vw is differentiated to calculate a wheel acceleration DVw. For instance, an estimated vehicle speed Vso is calculated by obtaining the minimum value of the wheel speed Vw which corresponds to the minimum value among the four wheels (i.e., MIN[Vw]; where MIN is a function for obtaining a minimum value).

In Step 104, a wheel slip amount Sv of each wheel is obtained based on the wheel speed Vw and the estimated vehicle body speed Vso (i.e., Sv=Vw−Vso). In Step 105, a judgment is made regarding whether one of the wheels  is under the condition in which the traction control can be performed, i.e., a control allowing judgment is performed. In Step 106, a starting condition of the traction control for one of the wheels  is judged. In Step 107, a braking judgment, that is to judge whether the brake pedal is stepped on or depressed, is performed. In Step 108, an ending condition of the traction control is judged. In Step 109, a target electric current of the booster solenoid is determined. Steps 105–109 mentioned above will be explained in more detail below with reference to FIGS. 4–9. In Step 110, a hydraulic pressure mode relative to the wheel cylinder of the wheels  is determined. In Step 111, a booster solenoid signal is outputted based on the target electric current determined in Step 109. In Step 112, a control solenoid signal (i.e., a signal for controlling the solenoid valves PC1–PC8) is outputted based on the hydraulic pressure mode determined in Step 110** to control the wheel cylinder hydraulic pressure.

Figure 4:
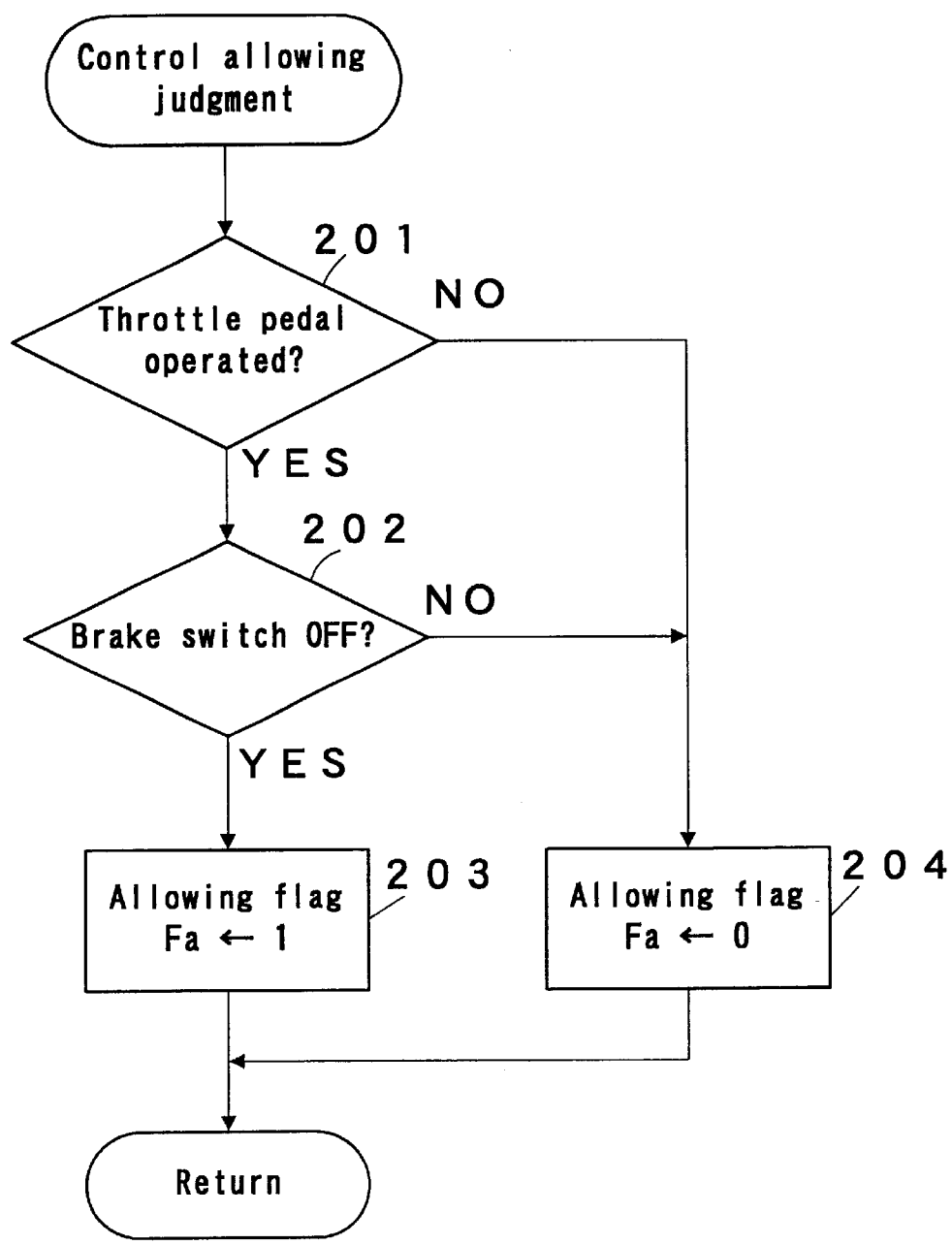
FIG. 4 is a flowchart illustrating the control allowing judgment routine forming a part of the flowchart shown in FIG. 3.

FIG. 4 shows the routine for carrying out the control allowing judgment of the traction control in Step 105 of FIG. 3. In Step 201 of FIG. 4, it is judged whether a throttle pedal is operated. When it is judged that the throttle pedal is operated, the program proceeds to Step 202 to judge the operational condition of the brake pedal BP. When the brake switch is OFF and the brake pedal BP is not operated, an allowing flag Fa of the traction control is set (1) in Step 203. Accordingly, when the throttle pedal is not operated or when the brake switch is ON, the transaction advances to Step 204 to reset (0) the allowing flag Fa so as not to perform the traction control.

Figure 5:
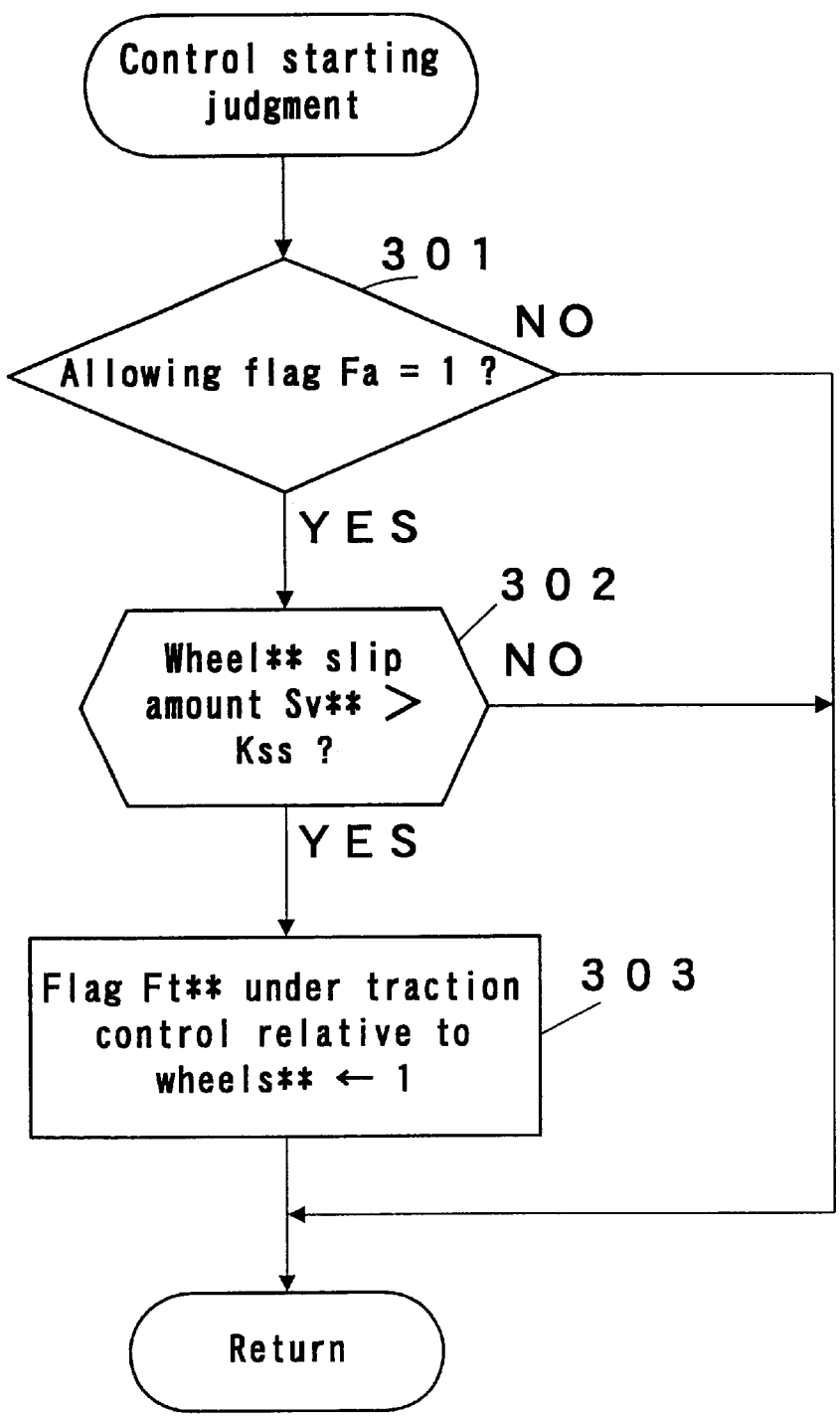
FIG. 5 is a flowchart illustrating the control starting judgment routine forming a part of the flowchart shown in FIG. 3.

FIG. 5 shows the routine for carrying out the control starting judgment in Step 106 of FIG. 3. In Step 301 of FIG. 5, the condition of the allowing flag Fa of one of the wheels  is judged. When the allowing flag Fa of the wheels is not set, the transaction is returned to the main routine of FIG. 3. When the allowing flag Fa is set, the transaction is advanced to Step 302 where the slip amount Sv of the wheels is compared with a predetermined amount Kss. When the slip amount SV is judged to be less than the predetermined amount Kss, the routine returns to the main routine. On the other hand, when the allowing flag Fa is set and the slip amount Sv exceeds the predetermined amount Kss, it is judged that traction control is to be started and thus a flag Ft under traction control relative to the wheels  is set (1) in Step 303.

Figure 6:
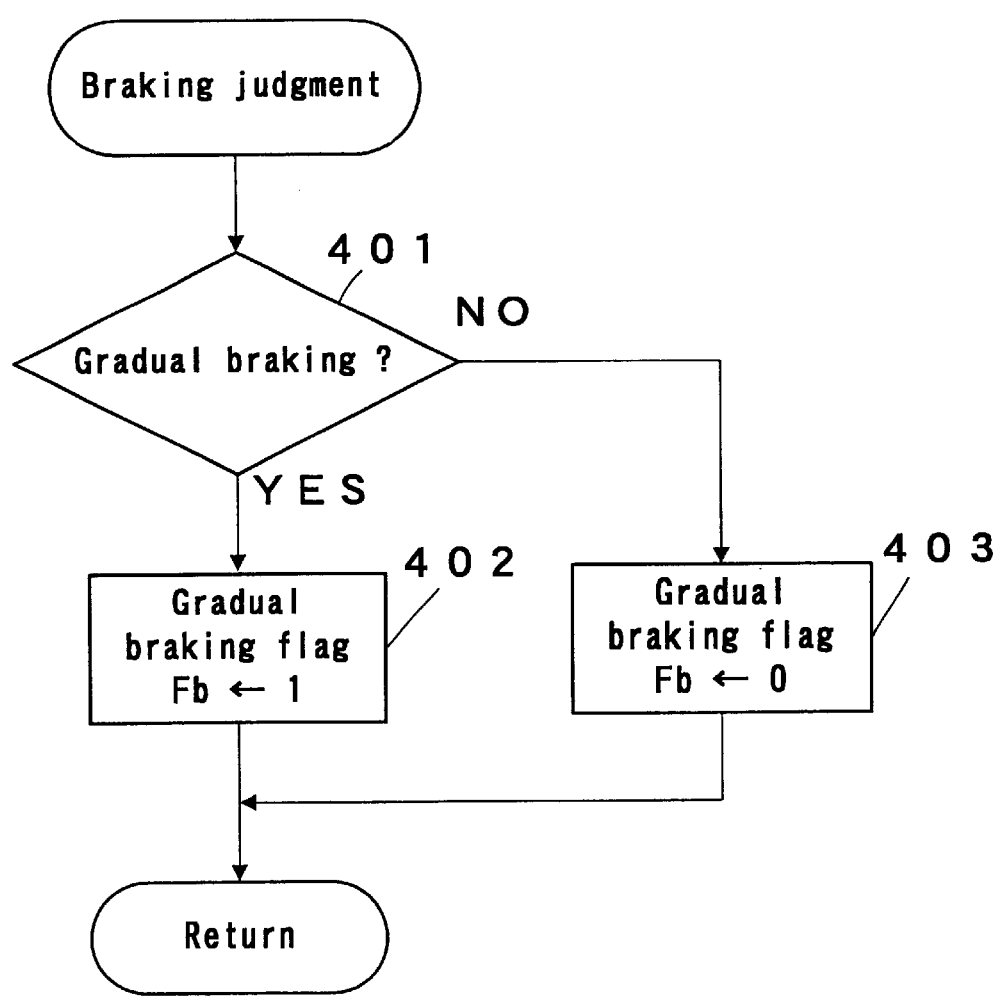
FIG. 6 is a flowchart illustrating the control braking judgment routine forming a part of the flowchart shown in FIG. 3.

FIG. 6 shows the routine carried out for the control braking judgment in Step 107. In Step 401 of FIG. 6, it is judged whether gradual braking is performed. That is, when the brake switch is ON and the operational amount of the brake pedal BP is less than a predetermined amount and the operational speed of the brake pedal BP is less than a predetermined speed, it is judged that gradual braking is being performed. The output values from a stroke sensor, a stepping force sensor or a master cylinder hydraulic pressure sensor can be used to indicate the operational amount of the brake pedal BP. A differentiated value of the output value of one of the sensors is applied as an operational speed of the brake pedal BP. When it is judged in Step 401 that gradual braking is being performed, the routine advances to Step 402 where a gradual braking flag Fb is set (1). When it is judged in step 401 that gradual braking is not being performed, the routine advances to Step 403 where the gradual braking flag Fb is reset (0).

Figure 7:
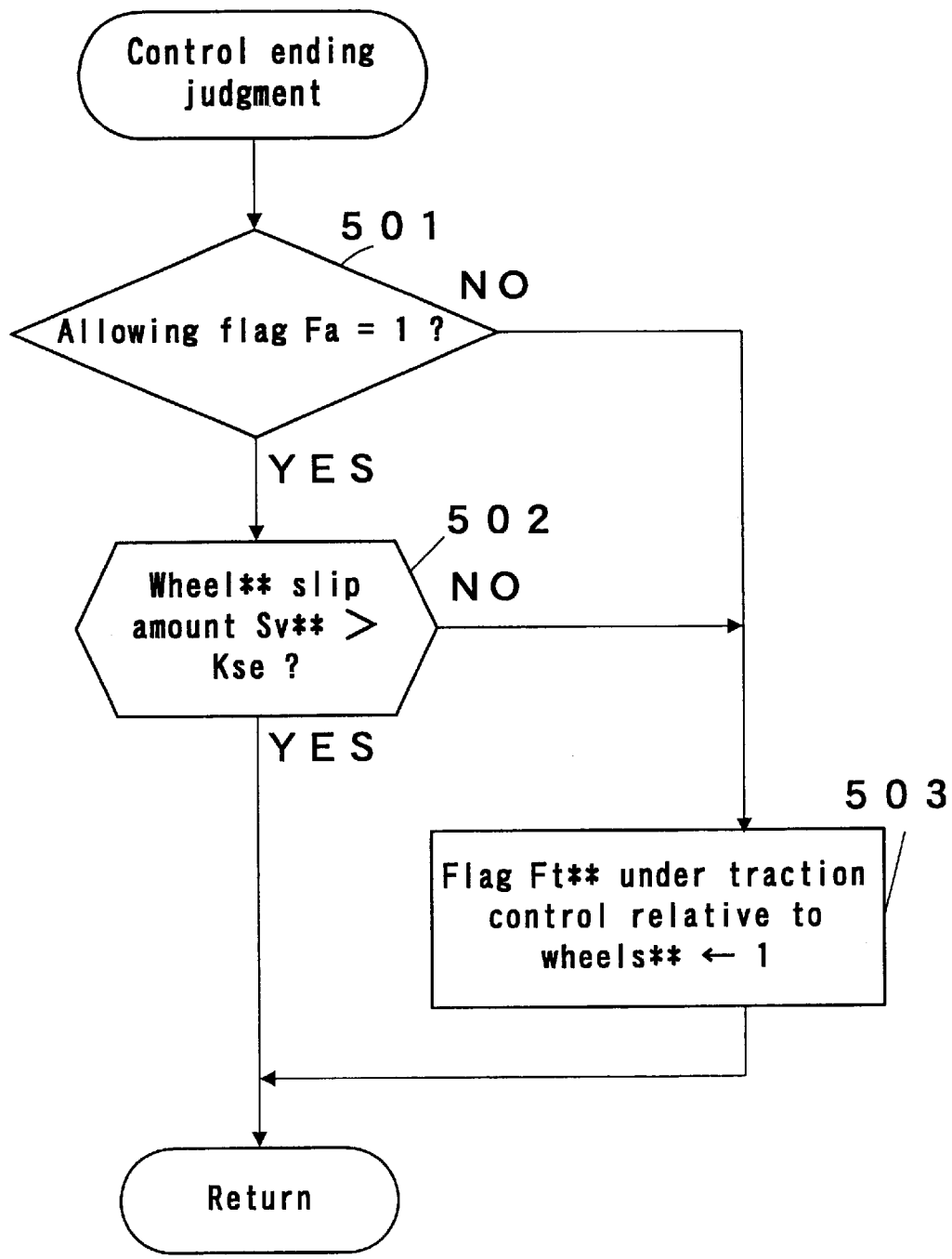
FIG. 7 is a flowchart illustrating the control ending judgment routine forming a part of the flowchart shown in FIG. 3.

FIG. 7 shows the routine carried out for the control ending judgment of the traction control in Step 108 of FIG. 3. In Step 501 of FIG. 7, the condition of the allowing flag Fa of the one of the wheels  is judged. When the allowing flag Fa is set, the transaction advances to Step 502 where the slip amount Sv of one of the wheels  is compared to a predetermined amount Kse (Kse is usually determined to be smaller than Kss). In Step 502, when it is judged that the condition of the slip amount Sv being less than the predetermined amount Kse continues for more than a predetermined time, the routine advances to Step 503. Otherwise, the program returns to the main routine to continue the traction control. Accordingly, when the allowing flag Fa is reset (0) with respect to the wheels or when the condition that the slip amount Sv of one of the wheels is less than the predetermined amount Kse for more than the predetermined time, it is determined that the traction control should be ended. Then, in Step 503, the flag Ft under traction control is reset (0).

Figure 8:
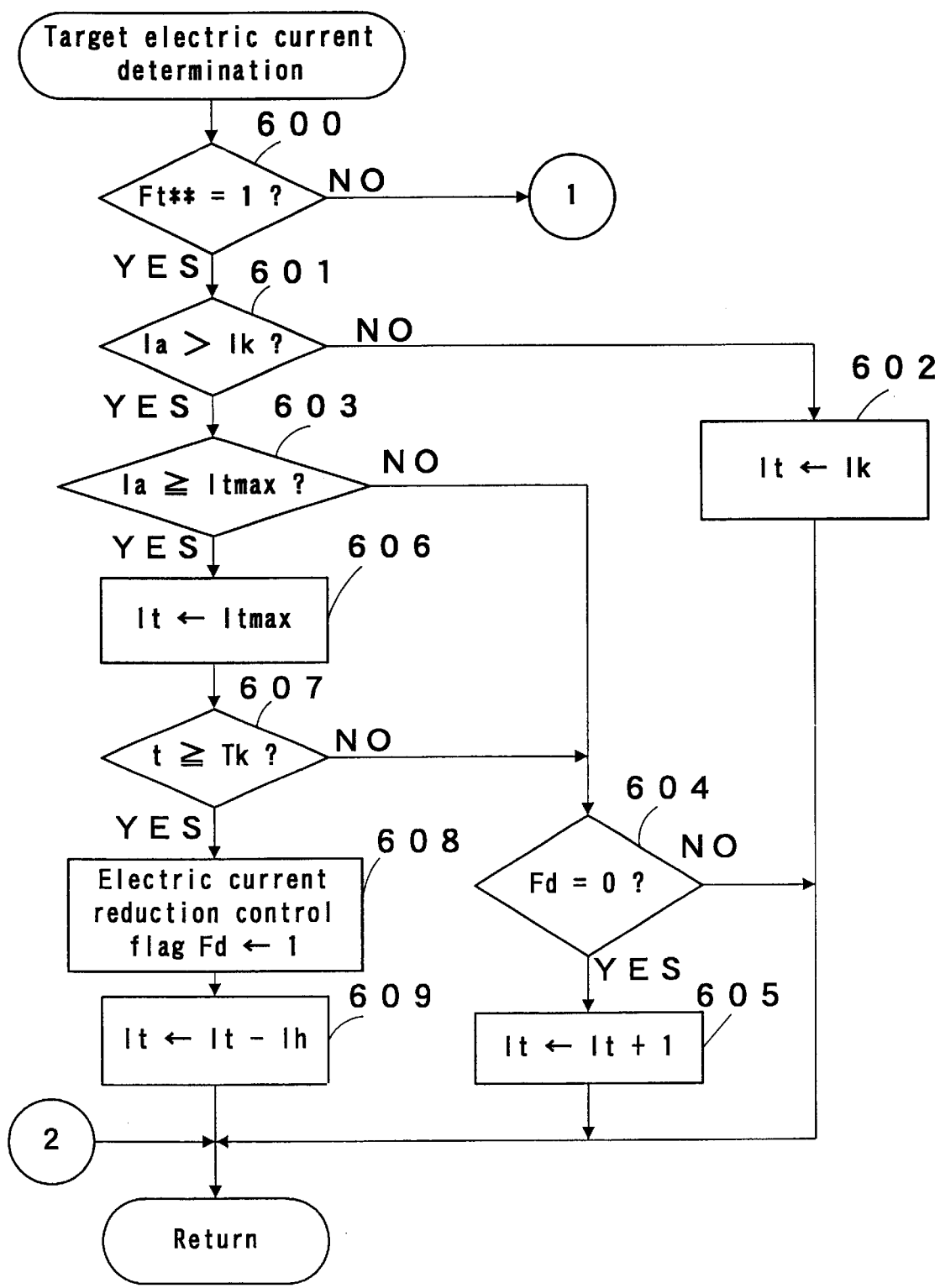
FIG. 8 is a flowchart illustrating the target electric current setting routine forming a part of the flowchart shown in FIG. 3.
Figure 9:
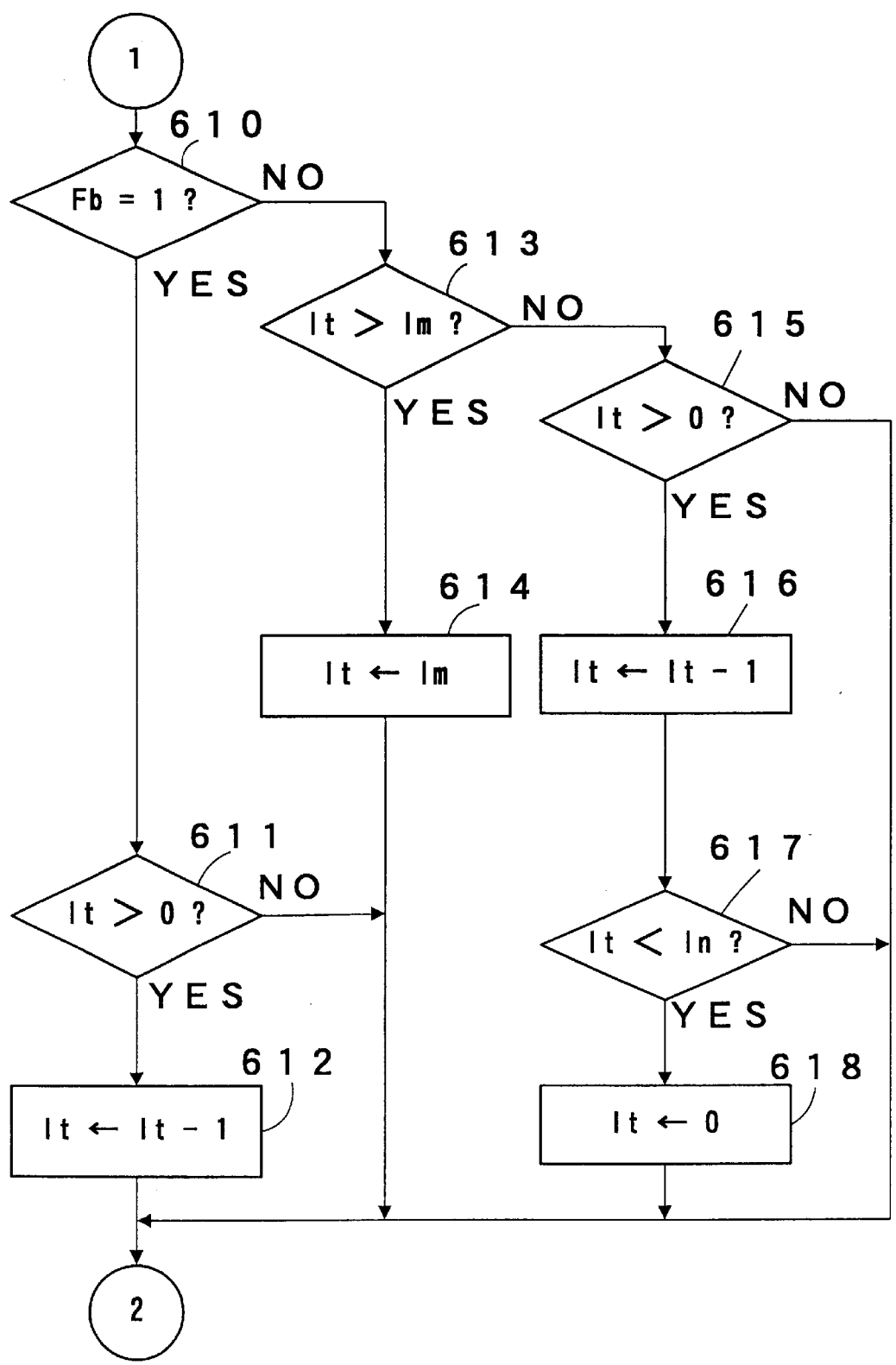
FIG. 9 is a flowchart illustrating the target electric current setting routine forming a part of the flowchart shown in FIG. 3.
Figure 10:
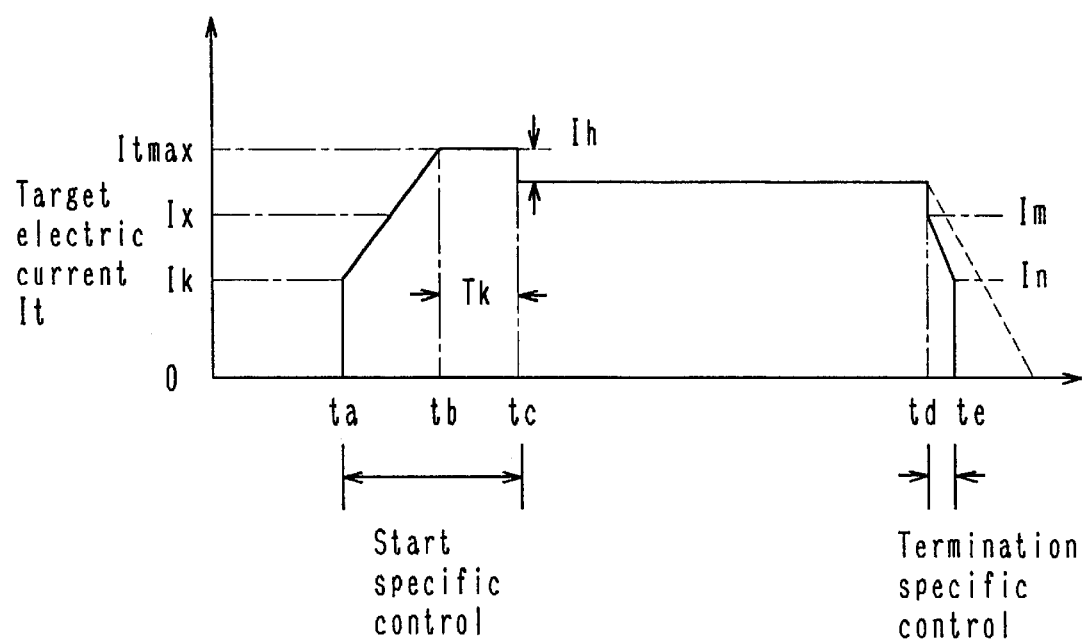
FIG. 10 is a timing chart showing an example of the target electric current setting according to the first embodiment of the present invention.

FIG. 8 and FIG. 9 show the routine for target electric current determination in Step 109 of FIG. 3. As shown in FIG. 10, Itmax represents a maximum value of the target electric current of the linear solenoid D1. Ix represents an electric current value of the linear solenoid D1 when the air valve V2 of the vacuum booster VB is opened by the booster actuator BD, that is the electric current value of the linear solenoid which is at a limitation of a non-operative zone. Ik is a starting target value at a start specific control for raising the electric current. Ik is determined to be the value greater than a half of the limitation value of the non-operative zone Ix. Tk represents a predetermined time until the output hydraulic pressure of the master cylinder is stabilized. Ih is the electric current value for reducing the target electric current considering the hysteresis associated with actuating and releasing the vacuum booster VB in order to smoothly release the pressure control by the booster. This control is referred to hereinafter as an electric current reduction control.

Im represents a termination target value at termination specific control for decreasing the electric current. In represents a rapid-decrease switching target value at the termination specific control for decreasing the electric current. The termination target value Im is greater than an electric value immediately before starting the stopping operation by releasing the actuation of the vacuum booster VB by the booster actuator BD (i.e., immediately before the air valve V2 comes to the closed position), i.e., is greater than the electric current value of the limitation of the non-operative zone at the termination specific control. The rapid-decrease switching target value In is determined to be smaller than the termination target value Im. For instance, although the termination target value Im is determined to be a value close to the limitation value of the non-operative zone Ix at starting, since the termination target value In is determined considering the hysteresis of the hydraulic pressure control at actuating and at releasing of the vacuum booster VB, the termination target value is not identical to the limitation value of the non-operative zone Ix.

Referring to the flowchart shown in FIG. 8, in Step 600 the condition of the flag Ft under the traction control of one of the wheels is judged. When the flag Ft under the traction control is set, the transaction advances to Step 601. In Step 601, an actual electric current Ia of the linear solenoid D1 is compared with the starting target value Ik at rising. When the actual electric current Ia is less than the starting target value Ik, the transaction advances to Step 602 to determine the target electric current It as the starting target value Ik (i.e., ta of FIG. 10). In Step 601, when it is judged that the actual electric current Ia is greater than the starting target value Ik, the transaction advances to Step 603 where the actual electric current Ia is further compared to the maximum value Itmax of the target electric current. When it is judged that the actual electric current Ia is less than the maximum value Itmax, the transaction advance to Step 604 to judge the condition of an electric current reduction control flag Fd for performing the aforementioned electric current reduction control. When it is determined that the electric current reduction control flag Fd has not been set, the transaction advances to Step 605. Then, the target electric current It is gradually incremented (between ta and tb in FIG. 10). When it is determined in Step 604 that the electric current reduction control flag Fd has already been set, the routine returns to the routine of FIG. 3.

On the other hand, when it is judged in Step 603 that the actual electric current Ia is greater than the maximum value Itmax, the program advances to Step 606 to determine the target electric current It as the maximum value Itmax (tb in FIG. 10). Then the routine advances to Step 607. Here, it is determined whether the predetermined time Tk has passed after the target electric current It is determined as the maximum value Itmax. When the predetermined time Tk has passed, it is judged that the master cylinder hydraulic pressure has stabilized, and the routine is advanced to Step 608 to set the electric current reduction control flag Fd (1). Then in Step 609, the target electric current It is renewed by reducing the electric current value Ih considering or taking into account the hysteresis from the target electric current value It at the maximum value Itmax (tc of FIG. 10).

When it is determined in Step 607 that the predetermined time Tk has not passed, the routine advances to Step 604. Accordingly, the generation of the noise along with the introduction of atmospheric air when opening the air valve V2 of the vacuum booster VB by the booster actuator BD and the vibration noise of the vehicle can be reduced at the start specific control, and thus the automatic acceleration control is smoothly performed.

When it is judged in Step 600 that the flag Ft under traction control has not been set, the routine advances to Step 610 of FIG. 9 to perform a termination specific judgment. In Step 610, the condition of the gradual braking flag Fb is judged. When the gradual braking flag Fb has been set, the pressure in the variable pressure chamber B3 is gradually reduced by gradually reducing the target electric current It. As a result, the transition from the automatic pressure control to the normal braking operation can be performed smoothly. When the gradual braking flag Fb has been set, the routine advances to Step 611 where it is judged whether the target electric current It is greater than zero. When the target electric current It is greater than zero, the target electric current It is decremented in Step 612 and then the routine returns to the routine of FIG. 3. Accordingly, during the gradual braking, the target electric current It is gradually reduced as shown with a dashed-line in FIG. 10. When the target electric current It has become zero, the routine returns to the routine of FIG. 3**.

When it is determined in Step 610 that the gradual braking flag Fb has not been set, the routine advances to Step 613 to compare the target electric current It with the termination target value Im. When the target electric current It is greater than the termination target value Im, the routine advances to Step 614 where the target electric current It is determined to be the termination target value Im (td of FIG. 10). When it is determined in Step 613 that the target electric current It is less than the termination target electric current Im, the routine advances to Step 615. In Step 615, it is judged whether the target electric current It is greater than zero. When the target electric current is still greater than zero, the target electric current It is decremented in Step 616. Then the routine advances to Step 617 to compare the target electric current It with the rapid-decrease switching target value In.

When it is judged in Step 617 that the target electric current It is less than the rapid-decrease switching target value, the routine advances to Step 618 to reduce the target electric current It to zero (te in FIG. 10) and then proceeds to return to the routine of FIG. 3. Thus, the target electric current It is instantaneously decreased. When it is determined in Step 617 that the target electric current It has already become zero in Step 617, the routine returns to the main routine of FIG. 3. Accordingly, the generation of the operational noise when the air valve V2 returns to the closed position upon release of the actuation of the vacuum booster VB by the booster actuator BD at termination specific control is reduced.

Figure 11:
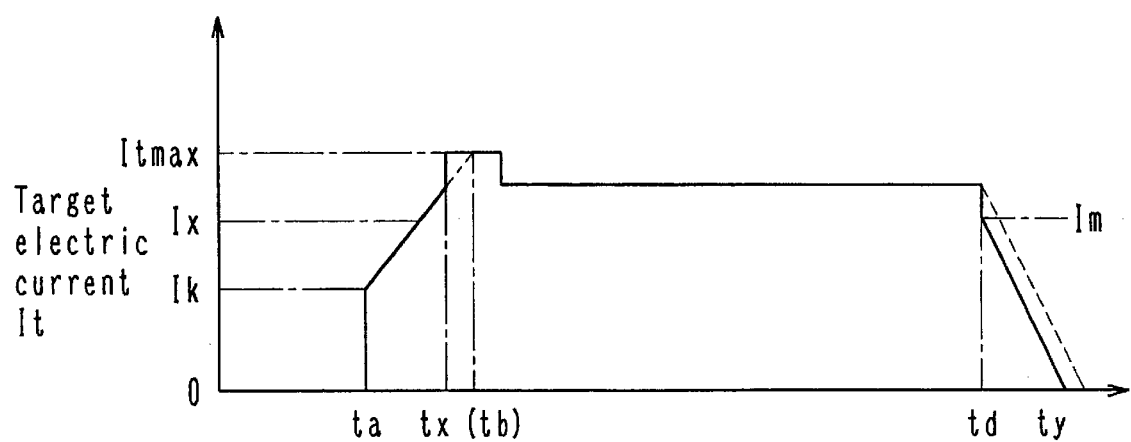
FIG. 11 is a timing chart showing another example of the target electric current setting according to a second embodiment of the present invention.

A second embodiment of the present invention is described below. The mechanical structure and operation as well as the procedure of the routine program of the second embodiment is the same as in the first embodiment except for the following. The second embodiment uses another timing chart, shown in FIG. 11, for the start specific control and the termination specific control. As shown in FIG. 11, the target electric current It is instantaneously increased to the maximum value Itmax when the target electric current value It reaches a predetermined value (i.e., the rapid-increase switching target value) between the limitation value of non-operative zone Ix and the maximum value Itmax (i.e., at tx which is before tb in FIG. 10). In this case, compared to the timing chart shown in FIG. 10, the time for reaching the maximum value Itmax can be shortened, and thus a good response can be obtained.

As shown in FIG. 11, in this second embodiment, the target electric current It is gradually reduced compared to the first embodiment shown in FIG. 10, after the target electric current It at the termination specific control reaches the termination target electric current Im. Accordingly, the target electric current It becomes zero at the point ty which is later than the time te of the first embodiment of FIG. 10. The predetermination of the target electric current It of the start specific control and termination specific control is not limited to the first and the second embodiments described above. The predetermination of the combination of the target electric current It of the start specific control and termination specific control according to the first and the second embodiments can be changed with respect to one another.

Because the starting target value Ik, termination target value Im, and rapid-decrease switching target value In for determining the target electric current It and the grade of the increase and decrease of the target electric current It are different depending on the characteristics of the vacuum boosters, the target electric current It is determined in accordance with the type of vacuum booster used in the vehicle. Further, instead of the starting target value Ik which is applied as a standard when determining the target electric current, the time for reaching the starting target value Ik can be applied as the standard for the judgment.

According to the first and the second embodiments of the of the vehicle motion control device of the present invention, the target electric current of the linear solenoid of the booster actuator is determined to be gradually increased close to the maximum value of the target electric current after instantaneously increasing the target electric current to the starting target value which is lower than the maximum value and which is also the electric value immediately before starting the operation of the vacuum booster when the brake pedal is not operated. Thus, the noise derived from the operation of the vacuum booster can be reduced and the energization of the linear solenoid is properly controlled to perform the smooth vehicle motion control.

In addition, by gradually increasing the target electric current of the linear solenoid to the rapid-increase switching target value after instantaneously increasing it to the starting target value, and by further instantaneously increasing it from the rapid-increase switching target value to the maximum value, the noise derived from the operation of the vacuum booster can be reduced to perform the prompt energization of the linear solenoid.

Also, when the target electric value of the linear solenoid is instantaneously decreased from the actuating condition by the booster actuator to the termination target value which is immediately before the electric value for starting the stopping operation and then it is determined to gradually reduce the target electric current of the linear solenoid to reach close to zero, the noise when releasing the actuation of the vacuum booster can be reduced, the energization of the linear solenoid can be properly controlled, and the vehicle motion control can be smoothly performed.

Further, by instantaneously decreasing the target electric current of the linear solenoid to the termination target value, and then gradually reducing the target electric current to the rapid-decrease switching target value which is lower than the termination target value and higher than zero, and further instantaneously decreasing the target electric current from the rapid-decrease switching target value to zero, the noise deriving from the operation of the vacuum booster is reduced and the energization of the linear solenoid is promptly performed.

A third embodiment of the vehicle motion control device of the present invention is explained below with reference to FIG. 12. The mechanical structure of the vehicle motion control device according to the third embodiment is the same as in the first and the second embodiments and so a detailed explanation will not be repeated here. The third embodiment of the vehicle motion control device will be explained with reference to application to VSC or vehicle stability or motion control.

When an ignition switch is ON, a program for vehicle motion control is carried out with a predetermined calculation cycle (e.g., 6 ms). In Step 701, the microcomputer CMP is initialized to clear various calculation values. In Step 702, detection signals of wheel speed sensors, the detection signal of a front wheel steering angle sensor (steering angle δf), the detection signal of a yaw rate sensor (yaw rate γa), the detection signal of lateral acceleration sensor (i.e., actual lateral acceleration Gya) and the detection signal of a throttle sensor are read-in.

In Step 703, a wheel speed Vw of each wheel ( corresponds to each wheel) is calculated to obtain a wheel acceleration DVw of each wheel by differentiating the wheel speed Vw. In Step 704, a maximum value of the wheel speed Vw of each wheel is calculated as an estimated vehicle body speed Vso at a gravitational center position of the vehicle (i.e., Vso=MAX (Vw)). Based on the wheel speed Vw of each wheel, an estimated vehicle body speed Vso at each wheel is obtained. Then a normalization for reducing the error due to wheel speed difference between the inner wheels and the outer wheels when the vehicle is turning is performed as the need arises. Further, the estimated vehicle speed Vso is differentiated to calculate the estimated vehicle acceleration DVso including the estimated vehicle deceleration which corresponds to the negative estimated vehicle acceleration at the gravitational center position of vehicle.

Next, in Step 705, an actual slip rate Sa of each wheel obtained based on the wheel speed Vw of each wheel and the estimated vehicle body speed Vso calculated in Step 703 and Step 704** is obtained by the following equation.

$$Sa^{}=(Vso^{}-Vw^{})/Vso^{}$$

In Step 706, a road frictional coefficient $\mu$ is approximately obtained based on the estimated vehicle body acceleration DVso at the gravitational center position of the vehicle and the actual lateral acceleration Gya of the detection signal of the lateral acceleration sensor YG by the following equation.

$$\mu=(DVso^2+Gya^2)^{1/2}$$

The detection of the road frictional coefficient can also be determined by sensors that directly detect the road frictional coefficient.

In Steps 707 and 708, a vehicle body skidding angular velocity Dβ and a vehicle body skidding angle β are calculated. The vehicle body skidding angle β represents the skid of the vehicle body relative to the running direction of the vehicle with an angle, which can be estimated in that the vehicle lateral skidding angular velocity Dβ corresponds to a differentiated value of the vehicle body skidding angle β (i.e., Dβ=dβ/dt). In Step 707, the vehicle lateral skidding angular velocity Dβ is obtained based on the following equation.

$$D\beta=Gya/Vso-\gamma a$$

This value is integrated in Step 708 to obtain the vehicle body lateral skidding angle β as follows.

$$\beta=\int(Gya/Vso-\gamma a)dt$$

Figure 13:
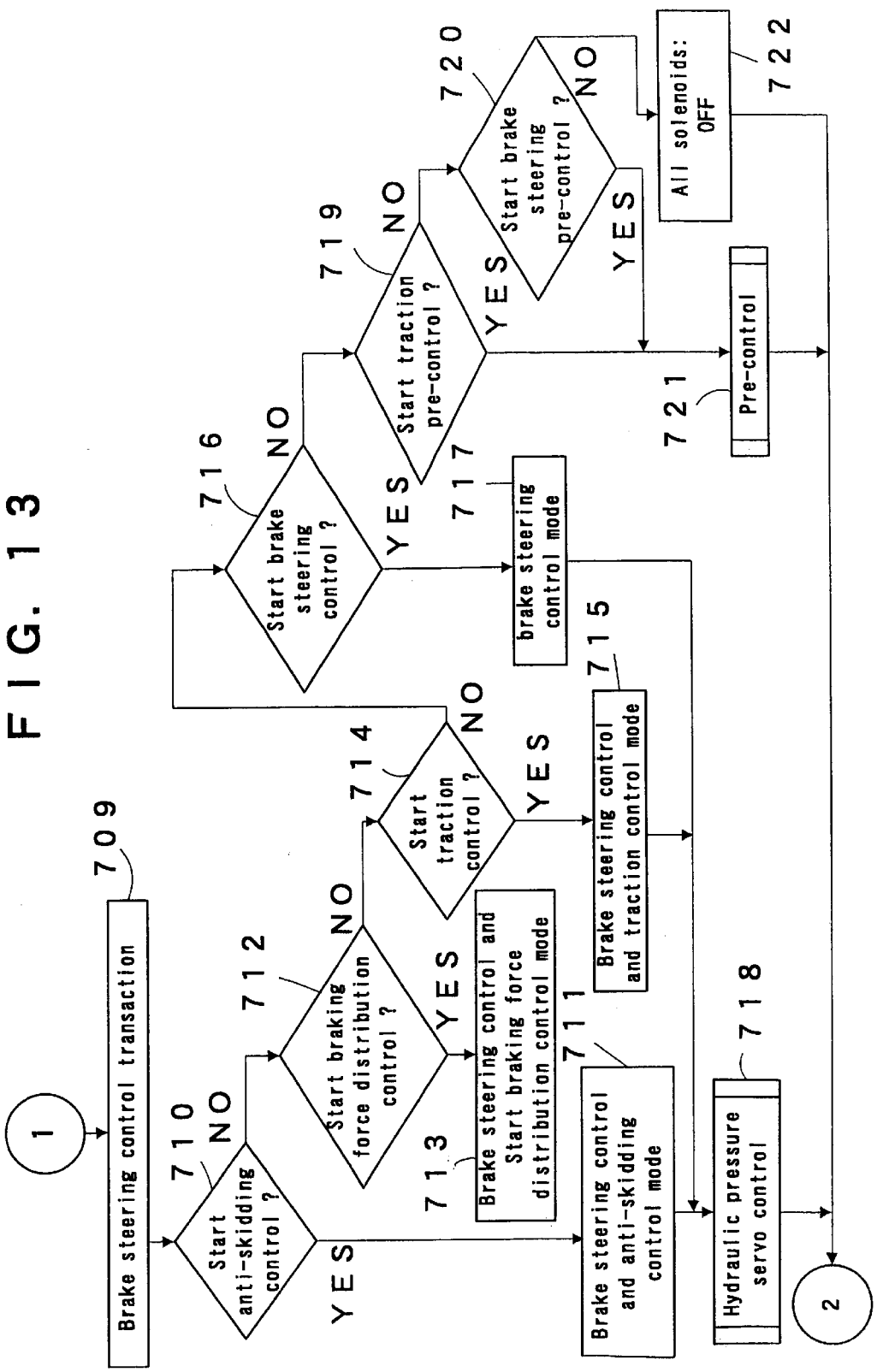
FIG. 13 is a flowchart of a part of the vehicle motion control.

The routine then advances to Step 709 of FIG. 13 where a necessity for starting brake steering control is judged and a target slip rate for the wheel to be controlled is determined. This brake steering control is overlapped to the control for all controlling modes which are mentioned hereinafter. Then the routine advances to Step 710 where it is judged whether an anti-skidding control starting condition is satisfied. When the starting condition of the anti-skidding control is satisfied and the necessity of starting the anti-skidding control at brake steering control is judged, an initial specific control is immediately stopped. Then in Step 711, a control mode for performing both the brake steering control and the anti-skidding control is determined.

When it is judged in Step 710 that the anti-skidding control starting condition has not been satisfied, the routine advances to Step 712. In Step 712, it is judged whether a braking force distribution control starting condition is satisfied. When the necessity for starting the braking force distribution control during the brake steering control is judged, the routine advances to Step 713. In Step 713, a control mode for performing both the brake steering control and braking force distribution control is determined. When it is determined in Step 712 that the braking force distribution control starting condition has not been satisfied, the routine advances to Step 714 to judge whether a traction control starting condition is satisfied. When the necessity for starting the traction control during the brake steering control is judged, a control mode for performing both the brake steering control and the traction control is determined in Step 715. When none of controls are judged to be started during the brake steering control, it is determined in Step 716 whether the brake steering control starting condition is satisfied.

When it is judged in Step 716 to start the brake steering control, the routine advances to Step 717 for determining a control mode for performing only the brake steering control. Based on this control mode in Step 717, the hydraulic pressure servo control is performed in Step 718. A braking torque for each wheel is controlled in accordance with the motion condition of the vehicle by a hydraulic pressure servo control of Step 718. Then, the routine returns to Step 710. In the braking force distribution control mode, in order to maintain the stability of the vehicle during the braking of the vehicle, the distribution of the braking force to the rear wheels relative to the front wheels is controlled.

On the other hand, when it is judged in Step 716 that the brake steering control starting condition has not been satisfied, the routine advances to Step 719. Here it is judged whether a starting condition of a pre-control before starting the traction control has been satisfied. When the starting condition of the pre-control before starting the traction control has not been satisfied, the routine advances to Step 720. In Step 720, it is judged whether a starting condition of a pre-control before starting the brake steering control is satisfied. When it is determined in Step 719 that the starting condition of the pre-control before starting the traction control is satisfied and when it is judged in Step 720 that the starting condition of the pre-control before starting the brake steering control is satisfied, the pre-control is performed in Step 721. The routine then returns to Step 701.

Figure 16:
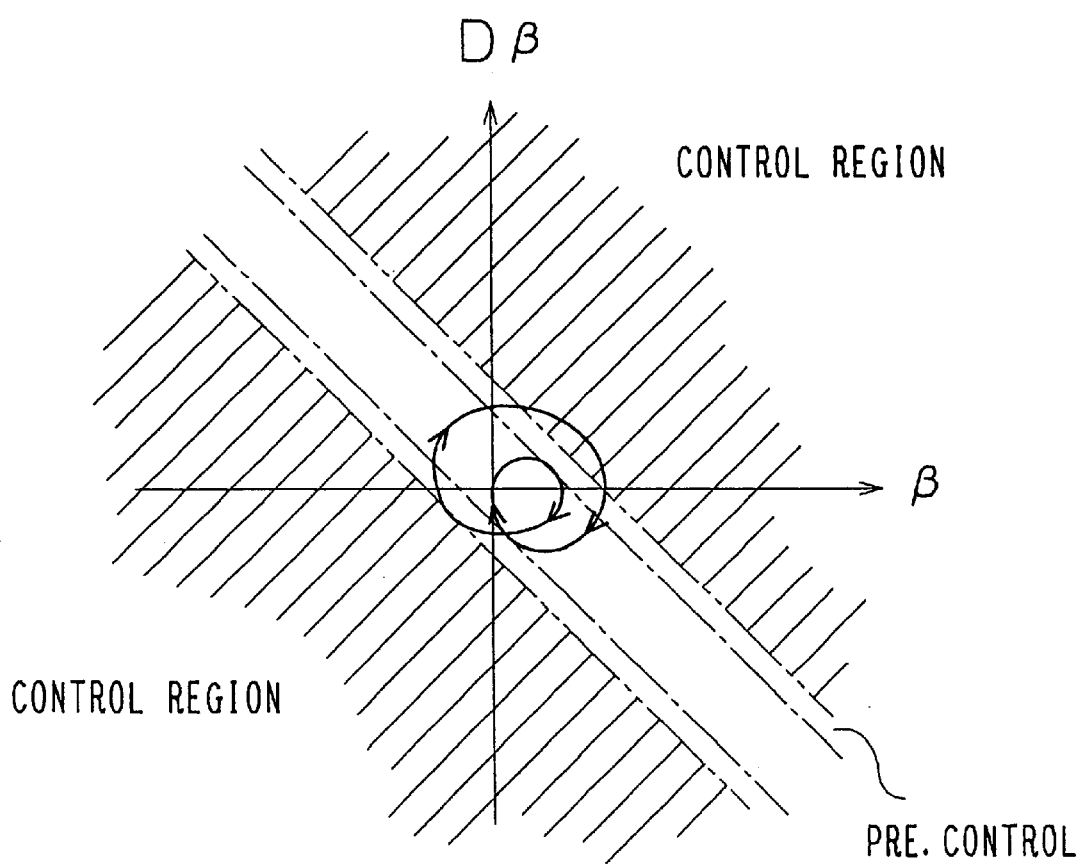
FIG. 16 is a map for starting judgment and ending judgment of an oversteer control and the pre-control of a brake steering control of FIG. 13.

In order to judge whether the starting condition of the pre-control before starting the traction control or the brake steering control is satisfied in Step 719 or Step 720, a threshold value for the pre-control is determined to be lower than a normal threshold for starting the control. When the relationship between the vehicle body skidding angular velocity Dβ and the vehicle body skidding angle β exceeds the threshold value for the pre-control, the pre-control starts. For instance, as shown in the control map of FIG. 16, the double dash chain lines show the threshold value for judgment of starting an oversteer control. Whether starting or ending, the oversteer control is judged based on whether the relationship between the vehicle body skidding angular velocity Dβ and the vehicle body skidding angle β is in a control region shown by the hatched area of FIG. 16. The chain lines show the threshold value for starting the pre-control. Accordingly, the pre-control starts when it is judged that the relationship between the vehicle body skidding angular velocity and the vehicle body skidding angle exceeds the threshold value of the chain lines at the judgment. When the relationship between the vehicle body skidding angular velocity Dβ and the vehicle body skidding angle β exceeds the double dash chain line to enter the control region, the oversteer control starts. When the relationship between the vehicle body skidding angular velocity Dβ and the vehicle body skidding angle β is out of the control region, the oversteer control ends. The process of the control is as shown by the arrowheaded curve of FIG. 16. In this case, the more the relationship between the vehicle body skidding angular velocity Dβ and the vehicle body skidding angle β deviates from the border shown with the double dash chain line of FIG. 16 towards the control region, the larger the control amount of the braking force of each wheel becomes.

When it is judged in Step 719 and Step 720 that the starting condition of the pre-control is satisfied, the pre-control is started in Step 721 which will be explained with reference to FIG. 15. When it is judged that the starting condition of the pre-control is not satisfied in Step 719 and Step 720, the solenoid of all of the solenoid valves is OFF in Step 722, the solenoid valves return to the normal condition shown in FIG. 1 and then the routine returns to Step 702. If necessary, based on Steps 711, 713, 715 and 717, a sub-throttle opening of a throttle controller TH is adjusted in accordance with the motion condition of the vehicle to reduce the output of the engine EG to thus restrict the driving force.

Figure 14:
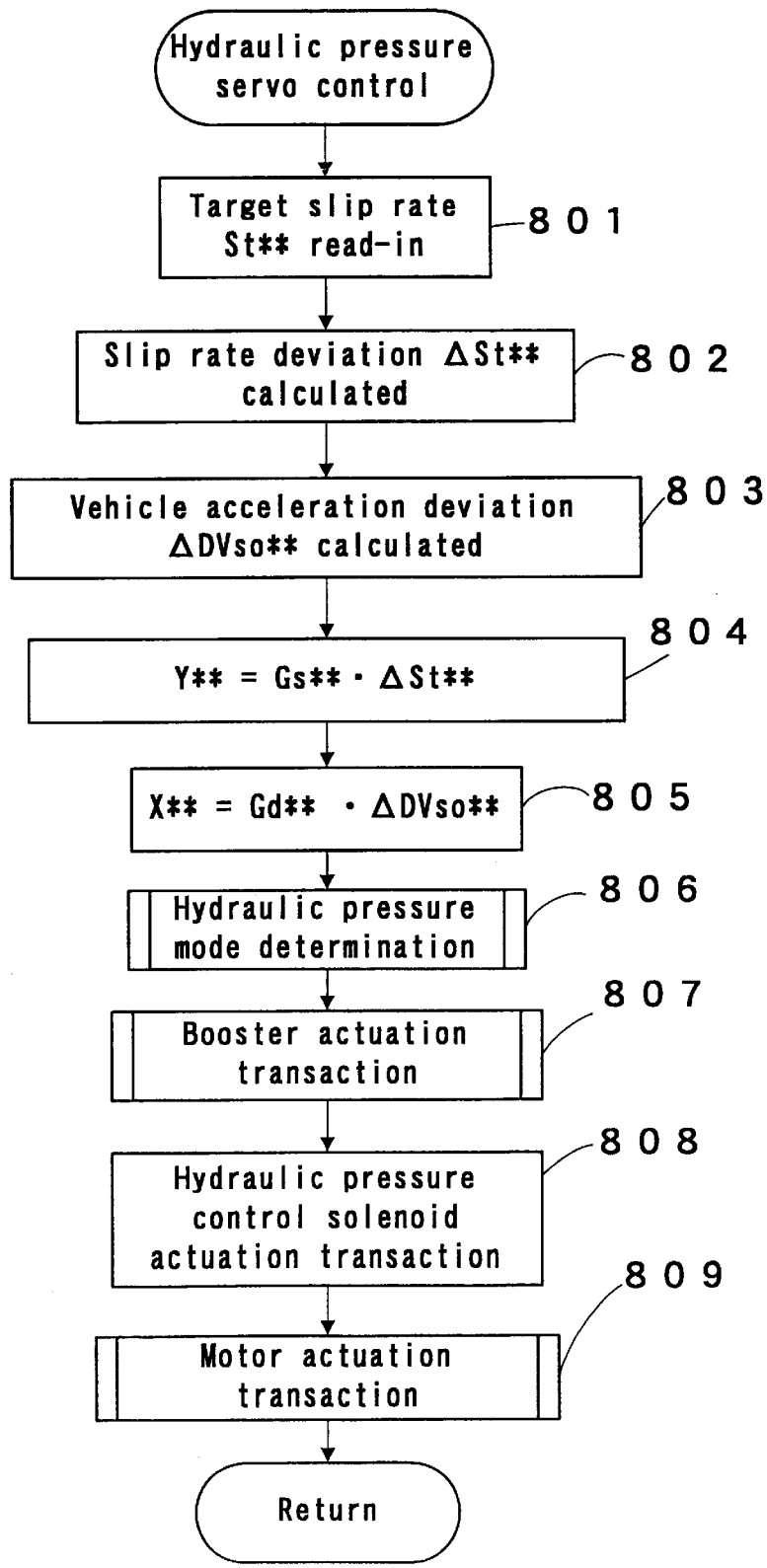
FIG. 14 is a flowchart illustrating the hydraulic pressure servo control forming a part of the flowchart shown in FIG. 13.

FIG. 14 shows the hydraulic pressure servo control performed in Step 718 of FIG. 13. A slip rate servo control of the wheel cylinder hydraulic pressure for each wheel is performed. In Step 801, a target slip rate $St^{}$ predetermined in accordance with the control mode of Steps 711, 713, 715 or 717 is read-in. This target slip rate $St^{}$ is read-in as the target slip rate $St^{**}$ for each wheel.

In Step 802, a slip rate deviation $\Delta St^{}$ for each wheel is calculated. Next, in Step 803, a vehicle acceleration deviation $\Delta DVso^{}$ is calculated. In Step 802, the difference between the target slip rate $St^{}$ and the actual slip rate $Sa^{}$ for each wheel is calculated to obtain the slip rate deviation $\Delta St^{}$ (i.e., $\Delta St^{}=St^{}-Sa^{}$). In Step 803, the difference between the estimated vehicle acceleration DVso at the gravitational center position of vehicle and the wheel acceleration $DVw^{}$ of the wheel to be controlled is calculated to obtain the vehicle acceleration deviation $\Delta DVso^{}$. Although the calculation method of the actual slip rate $Sa^{}$ of each wheel and the vehicle body acceleration deviation $\Delta DVso^{}$ are different in accordance with the control modes such as the anti-skidding control and the traction control, a detailed explanation is not set forth here as the calculations are derivable.

In Step 804, a first parameter $Y^{**}$ for the brake hydraulic pressure control for each control mode is calculated in the following manner.

$$Y^{}=Gs^{}\cdot \Delta St^{**};$$

where $Gs^{**}$ corresponds to a gain which is determined in accordance with the vehicle body lateral angle β

In Step 805, a second parameter $X^{**}$ for the brake hydraulic pressure control is calculated in the following manner.

$$X^{}=Gd^{}\, \Delta DVso^{**}$$

In this case, a gain $Gd^{}$ shows a constant value. Then in Step 806, the hydraulic pressure mode is determined in accordance with the first parameter $X^{}$ and the second parameter $Y^{}$ for each wheel. In Step 807**, the booster actuation routine, that is the actuation control of the booster actuator BD is performed.

Although FIG. 14 shows the hydraulic pressure servo control for the brake steering control, the automatic pressure control by the hydraulic pressure servo control is performed for the traction control as well, although a detailed explanation is not set forth here.

Figure 12:
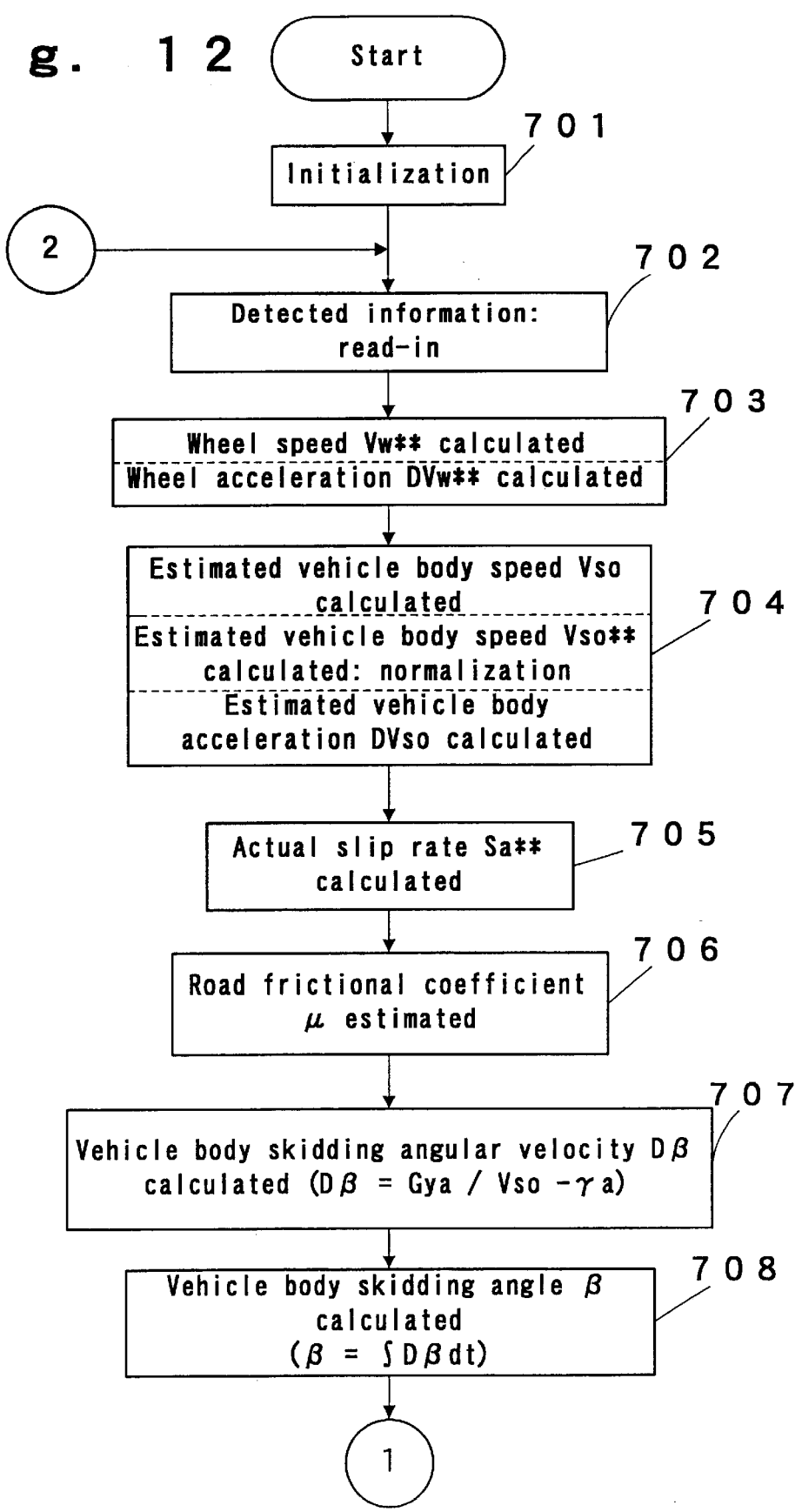
FIG. 12 is a flowchart of a part of the vehicle motion control according to another embodiment of the present invention.
Figure 15:
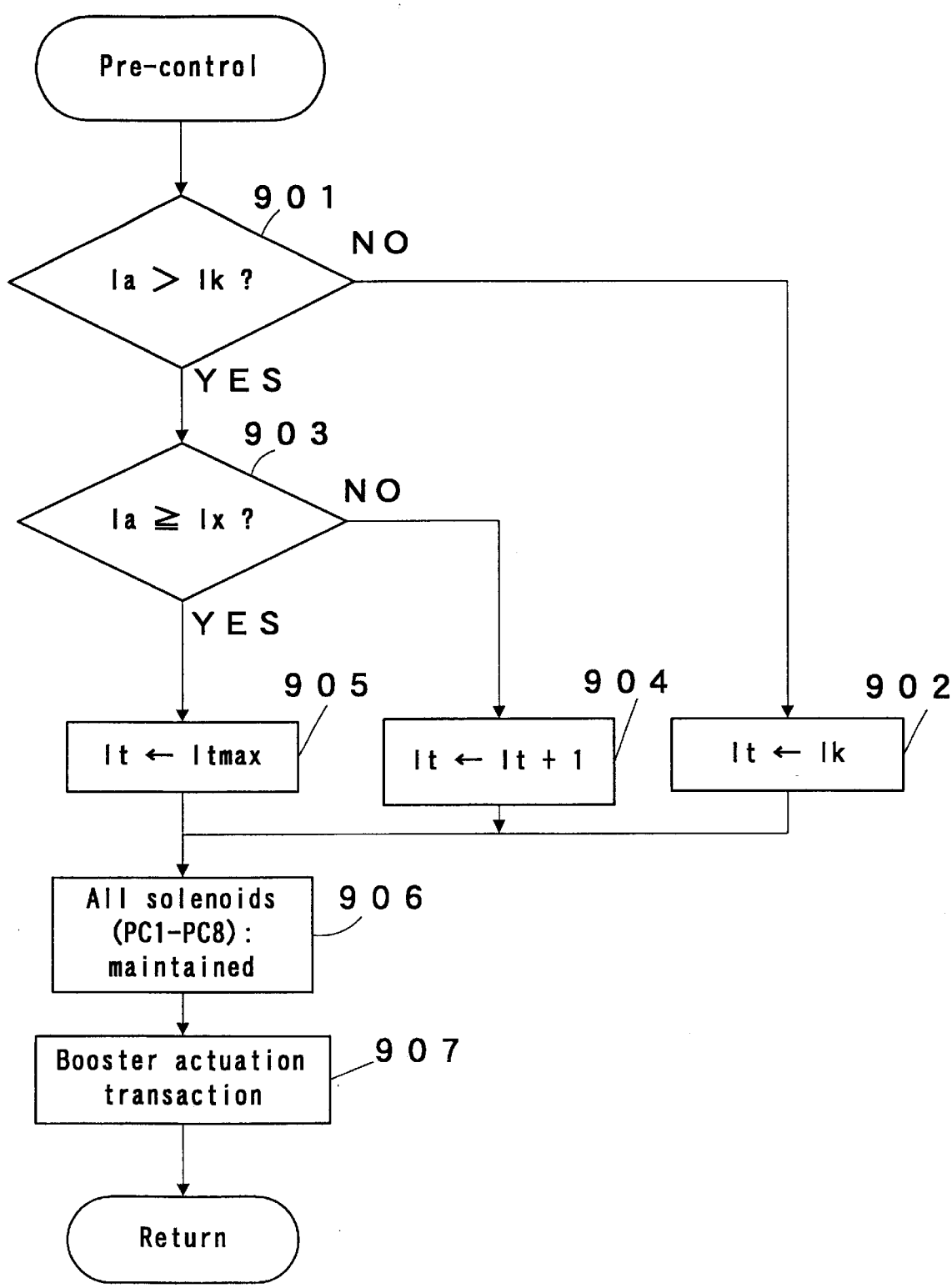
FIG. 15 is a flowchart illustrating the pre-control forming a part of the flowchart shown in FIG. 13.

FIG. 15 shows the pre-control routine carried out in Step 721 of FIG. 12. The routine of the pre-control will be explained referring to the timing chart of FIG. 17. In FIG.

17, Itmax represents the maximum value of a target electric current of the linear solenoid D1. Ix represents the electric current value of the linear solenoid D1 when the air valve V2 of the vacuum booster VB is opened by the booster actuator BD, that is the electric current value which is at a limitation of the non-operative zone. Ik represents a starting target value when starting the energization of the linear solenoid at starting the pre-control. Ik is determined to be greater than a half of the limitation value of non-operative zone Ix.

Referring to FIG. 15, an actual electric current Ia of the linear solenoid D1 is compared with the starting target value Ik in Step 901. When the actual electric current Ia is less than the starting target value Ik, the routine advances to Step 902. In Step 902, the target electric current It is determined to be the starting target value Ik (i.e., t1 in FIG. 17). When it is judged that the actual electric current Ia is greater than the starting target value Ik in Step 901, the routine advances to Step 903 where the actual electric current Ia is further compared with the limitation value of the non-operative zone Ix. As a result, when it is judged that the actual electric current Ia is less than the limitation value of the non-operative zone Ix, the routine advances to Step 904. In Step 904, the target electric current It is gradually incremented (i.e., t1–t2 in FIG. 17). On the other hand, when it is judged that the actual electric current Ia is greater than the limitation value of non-operative zone Ix in Step 903, the routine advances to Step 905. In Step 905, the target electric current It is determined to be the maximum value Itmax (i.e., t2 of FIG. 17).

Then the routine advances to Step 906. In Step 906, a maintaining signal is outputted to all solenoids for the solenoid valves PC1–PC8 forming the hydraulic pressure control valve device, and the communication between the master cylinder MC and all of the wheel cylinders is interrupted. Then the routine advances to Step 907, where the booster actuating routine is performed. That is, the target electric current It is outputted to the linear solenoid D1 of the booster actuator BD.

Figure 17:
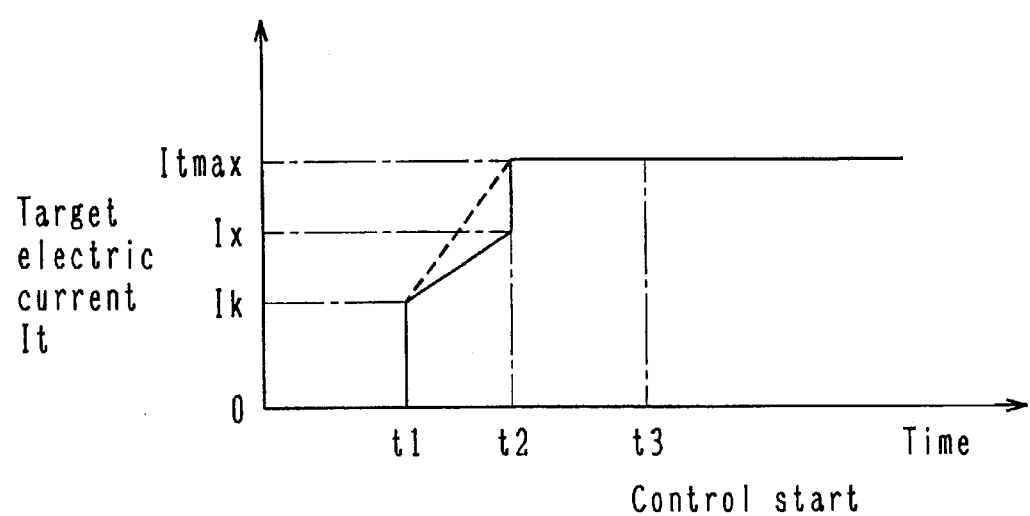
FIG. 17 is a timing chart showing an example of the target electric current setting according to an embodiment of the present invention.

Accordingly, although it is determined that the target electric current It is instantaneously increased to the maximum value Itmax when reaching the limitation value of the non-operative zone Ix of the rapid-increase switching target value, as shown by the dashed line of FIG. 17, the target electric current It may be gradually increased close to the maximum value Itmax of the target electric current It after instantaneously increasing the target electric current It to the starting target value Ik. Thus, the generation of the vehicle body oscillation noise and the noise associated with introducing atmospheric air by opening the air valve V2 of the vacuum booster VB by the booster actuator BD during the pre-control is reduced and the pre-control is smoothly performed.

Because the starting target value Ik when determining the target electric current It for the pre-control, the limitation value of the non-operative zone Ix, and the grade of the increase and the decrease are different depending on the characteristics of the controlled vacuum booster VB, the target electric current It is determined in accordance with the type of vacuum booster VB used in the vehicle. Instead of the starting target value Ik standardized when determining the target electric current It, a time reaching the starting target value Ik can be applied as the standard for the judgment.

After the aforementioned pre-control, the traction control or the brake steering control starts at t3 in FIG. 17. The target electric current It after the start of the traction control or the brake steering control, i.e., after t3, is maintained at the maximum value Itmax.

According to the third embodiment of the vehicle motion control device of the present invention, the communication between the automatic hydraulic pressure device and the wheel cylinder is interrupted by the actuation of the hydraulic pressure control valve when the brake pedal is not under the operation and before the vehicle motion control starts. The target electric current of the linear solenoid of the booster actuator is determined to be instantaneously increased to an electric current value which corresponds to immediately before starting the operation of the vehicle motion control and is less than the maximum value of the target value of the linear solenoid. The target electric current of the linear solenoid is instantaneously increased to the starting target value, then is gradually increased to the rapid-increase switching target value, and further is instantaneously increased from the rapid-increase switching target value to the maximum value. Thus, noise resulting from the operation of the vacuum booster is reduced and the energization to the solenoid valve can be properly controlled to achieve the smooth performance of the automatic pressure control at the pre-control before the vehicle motion control starts.

Regarding the aforementioned vehicle motion control device, in order to increase the accuracy of the control and the start and end of the judgment of controls such as brake steering control, it is preferable to detect the operational stroke of the brake pedal BP using a stroke sensor to obtain the detected output of the stroke sensor as input information for each control. However, there are two conditions that may cause problems. A first condition is that the brake pedal BP is not operated and the communication between the master cylinder MC and all of the wheel cylinders Wfl, Wfr, Wrl, Wrr is interrupted by the solenoid valves PC1–PC8 during the brake steering control and the traction control. A second condition is that the brake pedal BP is operated and the communication between the master cylinder MC and all the wheel cylinders Wfl, Wfr, Wrl, Wrr is interrupted by the solenoid valves PC1–PC8 during the brake steering control. When the brake pedal BP is operated during the first condition or when the brake pedal BP is further stepped on during the second condition, the brake pedal BP cannot stroke. Thus, in those cases, the brake pedal operating information is not outputted from the stroke sensor. This problem that the stroke sensor cannot be detected can be solved by establishing communication between the master cylinder MC and at least one of the wheel cylinders and at least one of reservoirs by compulsorily opening the normally open solenoid valve and normally closed solenoid valve for controlling the hydraulic pressure of the wheel cylinder at least at one of the wheels which is not the object of the control. The problem can also be solved by establishing communication between the master cylinder and at least one of the wheel cylinders by compulsorily opening the normally open solenoid valve for controlling the hydraulic pressure of the wheel cylinder of at least one of the wheels which is not the object of the control. That the communication between the master cylinder MC and all of the wheel cylinders has interrupted for a predetermined time may be a condition for transition from the condition that the master cylinder MC is interrupted from all of the wheel cylinders to the condition that the master cylinder MC is compulsorily in communication with at least one of the wheel cylinders which is not the object of the control. Further, when the master cylinder MC is interrupted from all wheel cylinders at the final stage of the control, the communication between the master cylinder MC and at least one of the wheel cylinders which is not to be controlled may be compulsorily established. In this case, that the condition for transition can be determined to be when the block of the communication between the maser cylinder and all wheel cylinder during the final stage of the control continues for a predetermined time.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing form the spirit of the present invention. Accordingly, it is expressly intended that all such variations, changes and equivalents which fall within the apart and scope of the present inventions as defined in the claims, be embraced thereby.

What is claimed is:

1. A vehicle motion control device comprising:
   a plurality of wheel cylinders provided on respective wheels of a vehicle;
   an automatic hydraulic pressure generator for generating a brake hydraulic pressure irrespective of operation of a brake pedal;
   a hydraulic pressure control valve device provided between the automatic hydraulic pressure generator and the respective wheel cylinders for controlling a brake hydraulic pressure of respective wheel cylinders; and
   control means for performing a vehicle motion control by controlling the automatic hydraulic pressure generator in accordance with a vehicle motion condition of the vehicle irrespective of the operation of the brake pedal and by controlling the hydraulic pressure control valve device;
   the automatic hydraulic pressure generator comprising:
      a linear solenoid;
      a vacuum booster operating at least in accordance with operation of the brake pedal; and
      a booster actuator for actuating the vacuum booster by controlling the linear solenoid based on a predetermined target electric current irrespective of the operation of the brake pedal;
   the control means instantaneously increasing the target electric current of the linear solenoid to an electric current value which corresponds to an electric value immediately before the vacuum booster starts the operation and which is lower than a maximum value of the target electric current of the linear solenoid, and increasing the target electric current of the linear solenoid to approach the maximum value of the target electric current when the brake pedal is not operated.

2. The vehicle motion control device according to claim 1, wherein the control means instantaneously increases the target electric current of the linear solenoid to the starting target value, and increases the target electric current of the linear solenoid over a period of time to a rapid-increase switching target value which is greater than the starting target value and less than the maximum value, and further instantaneously increases the target electric current of the linear solenoid from the rapid-increase switching target value to the maximum value when the brake pedal is not operated.

3. A vehicle motion control device according to claim 2, wherein the vacuum booster comprises a variable pressure chamber, a constant pressure chamber, an air valve including a valve body and a valve seat for establishing and interrupting communication between the variable pressure chamber and atmosphere, and a vacuum valve including a valve seat and a valve body for establishing and interrupting communication between the variable pressure chamber and the constant pressure chamber, the air valve starting to open when the target electric current value is less than the rapid-increase switching target value and is greater than the electric value immediately before the vacuum booster starts the operation.

4. The vehicle motion control device according to claim 1, wherein the vacuum booster comprises a variable pressure chamber, a constant pressure chamber, an air valve including a valve body and a valve seat for establishing and interrupting communication between the variable pressure chamber and atmosphere, and a vacuum valve including a valve seat and a valve body for establishing and interrupting communication between the variable pressure chamber and the constant pressure chamber, the air valve starting to open when the target electric current value is less than the maximum value and is greater than the electric value immediately before the vacuum booster starts the operation.

5. A vehicle motion control device comprising:
   a plurality of wheel cylinders provided on respective wheels of a vehicle;
   an automatic hydraulic pressure generator for generating a brake hydraulic pressure irrespective of operation of a brake pedal;
   a hydraulic pressure control valve device provided between the automatic hydraulic pressure generator and the respective wheel cylinders for controlling a brake hydraulic pressure of respective wheel cylinders; and
   control means for performing a vehicle motion control by controlling the automatic hydraulic pressure generator in accordance with a vehicle motion condition of the vehicle irrespective of the operation of the brake pedal and by controlling the hydraulic pressure control valve device;
   the automatic hydraulic pressure generator comprising:
      a linear solenoid;
      a vacuum booster operating at least in accordance with the operation of the brake pedal; and
      a booster actuator for actuating the vacuum booster by controlling the linear solenoid based on a predetermined target electric current irrespective of the operation of the brake pedal;
   the control means instantaneously decreasing the target electric current of the linear solenoid from the actuated condition by the booster actuator to a termination target value which corresponds to an electric value immediately before starting to stop the actuation of the vacuum booster, and then decreasing the target electric current of the linear solenoid to approach zero when the brake pedal is not operated.

6. A vehicle motion control device according to claim 5, wherein the vacuum booster comprises a variable pressure chamber, a constant pressure chamber, an air valve including a valve body and a valve seat for establishing and interrupting communication between the variable pressure chamber and an atmosphere, and a vacuum valve including a valve seat and a valve body for establishing and interrupting communication between the variable pressure chamber and the constant pressure chamber, the air valve starting to close when the target electric current value is less than the termination target value and is greater than zero.

7. The vehicle motion control device according to claim 5, wherein the control means instantaneously decreases the target electric current of the linear solenoid to the termination target value, then decreases the target electric current over a period of time to a rapid-decrease switching target value which is less than the termination target value and greater than zero, and further instantaneously decreases the target electric current from the rapid-decrease switching target value to zero when the brake pedal is not operated.

8. A vehicle motion control device according to claim 7, wherein the vacuum booster comprises a variable pressure chamber, a constant pressure chamber, an air valve including a valve body and a valve seat for establishing and interrupting communication between the variable pressure chamber and atmosphere, and a vacuum valve including a valve seat and a valve body for establishing and interrupting communication between the variable pressure chamber and the constant pressure chamber, the air valve starting to close when the target electric current value is less than the termination target value and is greater than the rapid-decrease switching target value.

9. A vehicle motion control device comprising:
  a plurality of wheel cylinders provided on respective wheels of a vehicle;
  an automatic hydraulic pressure generator for generating a brake hydraulic pressure irrespective of operation of a brake pedal;
  a hydraulic pressure control valve device provided between the automatic hydraulic pressure generator and the respective wheel cylinders for controlling a brake hydraulic pressure of respective wheel cylinders; and
  control means for performing a vehicle motion control by controlling the automatic hydraulic pressure generator in accordance with a vehicle motion condition of the vehicle irrespective of the operation of the brake pedal and by controlling the hydraulic pressure control valve device;
  the automatic hydraulic pressure generator comprising:
    a linear solenoid;
    a vacuum booster operating at least in accordance with the operation of the brake pedal; and
    a booster actuator for actuating the vacuum booster by controlling the linear solenoid based on a predetermined target electric current irrespective of the operation of the brake pedal;
  the control means instantaneously increasing the target electric current of the linear solenoid to a starting target value which corresponds to an electric current value immediately before the vacuum booster starts the operation by the actuation of the booster actuator and which is less than a maximum value of the target electric current of the linear solenoid, and increasing the target electric current to approach the maximum value of the target electric current when the brake pedal is not operated and before the vehicle motion control starts.

10. The vehicle motion control device according to claim 9, wherein the hydraulic pressure control valve device is actuated and communication between the automatic hydraulic pressure generator and the wheel cylinder is interrupted.

11. The vehicle motion control device according to claim 9, wherein the control means actuates the hydraulic pressure control valve for interrupting communication between the automatic hydraulic pressure generator and the wheel cylinders and instantaneously increases the target electric current of the linear solenoid to the starting target value, then increases the target electric current over a period of time to a rapid-increase switching target value which is greater than the starting target value and less than the maximum value, and further instantaneously increases the target electric current from the rapid-increase switching target value to the maximum value when the brake pedal is not operated and before the vehicle motion control starts.

* * * * *